US011772102B2

(12) United States Patent
Bilodeau et al.

(10) Patent No.: US 11,772,102 B2
(45) Date of Patent: Oct. 3, 2023

(54) COMBINED GRINDING AND LEACHING APPARATUS FOR ORES AND WASTES AND METHODS OF USE THEREOF

(71) Applicant: HIS MAJESTY THE KING IN RIGHT OF CANADA AS REPRESENTED BY THE MINISTER OF NATURAL RESOURCES, Ottawa (CA)

(72) Inventors: Magella Bilodeau, Gatineau (CA); Nicolas Reynier, Gatineau (CA); André Demers, Gatineau (CA)

( * ) Notice: Subject to any disclaimer, the term of this patent is extended or adjusted under 35 U.S.C. 154(b) by 229 days.

(21) Appl. No.: 17/177,307

(22) Filed: Feb. 17, 2021

(65) Prior Publication Data
US 2021/0170422 A1 Jun. 10, 2021

Related U.S. Application Data

(62) Division of application No. 16/009,336, filed on Jun. 15, 2018, now abandoned.

(30) Foreign Application Priority Data

Jun. 16, 2017 (GB) ..................................... 1709612

(51) Int. Cl.
*B02C 19/10* (2006.01)
*C22B 1/00* (2006.01)
(Continued)

(52) U.S. Cl.
CPC .............. *B02C 19/10* (2013.01); *B02C 17/16* (2013.01); *B02C 17/163* (2013.01); *C22B 1/005* (2013.01);
(Continued)

(58) Field of Classification Search
CPC ......... B02C 13/14; B02C 13/16; B02C 13/18; B02C 13/1807; B02C 13/1814;
(Continued)

(56) References Cited

U.S. PATENT DOCUMENTS 2,137,051 A 5/1937 Jain
3,332,628 A * 7/1967 Wadham ............... A23G 3/0205
241/179
(Continued)

FOREIGN PATENT DOCUMENTS

CA 2022300 1/1992
CN 103334017 A 10/2013
(Continued)

OTHER PUBLICATIONS

Julcour et al. "Development of an attrition-leaching hybrid process for direct aqueous mineral carbonation", Chemical Engineering Journal, vol. 262, Feb. 15, 2015, pp. 716-726.
(Continued)

*Primary Examiner* — Matthew Katcoff

(57) ABSTRACT

Disclosed is an apparatus that is an attrition mill for grinding or comminuting ores, mine wastes, and radioactive wastes some of which may comprise metals, which may include uranium and/or cesium and/or mercury and/or thorium and/ or rare earth elements. Also disclosed are processes that employ the apparatus for combined grinding and optionally leaching metals from ores and wastes. Some such methods comprise an optional step of grinding and mixing the ore or waste with a solid inorganic base with water addition or with an aqueous inorganic base, follow by a step of grinding and mixing the ore or waste with an aqueous inorganic acid with or without leaching salt addition, to solubilize the metals present in the ore or the waste. The disclosed apparatus and methods, in some embodiments, enable efficient grinding
(Continued)

and attrition of ores substrates and mine wastes even without need for grinding media.

9 Claims, 20 Drawing Sheets

(51) Int. Cl.
*C22B 3/06* (2006.01)
*C22B 59/00* (2006.01)
*C22B 60/02* (2006.01)
*C22B 3/02* (2006.01)
*B02C 17/16* (2006.01)

(52) U.S. Cl.
CPC .................. *C22B 3/02* (2013.01); *C22B 3/06* (2013.01); *C22B 59/00* (2013.01); *C22B 60/02* (2013.01)

(58) Field of Classification Search
CPC ... B02C 13/1821; B02C 13/28; B02C 13/282; B02C 13/2808; B02C 13/2812; B02C 13/288; B02C 17/002; B02C 17/007; B02C 17/16; B02C 17/161; B02C 17/163; B02C 17/165; B02C 17/166; B02C 17/186; B02C 17/1865; B02C 17/187; B02C 2013/2804; B02C 2013/2812
See application file for complete search history.

(56) References Cited

U.S. PATENT DOCUMENTS

| | | | |
|---|---|---|---|
| 3,944,414 A | | 3/1976 | Yanagida |
| 4,242,129 A | | 12/1980 | Kellerwessel et al. |
| 4,244,531 A | * | 1/1981 | Szegvari ................. B02C 17/16 241/172 |
| 4,441,993 A | | 4/1984 | Howald |
| 4,749,133 A | | 7/1988 | Sayler et al. |
| 5,007,589 A | | 4/1991 | Evans et al. |
| 5,630,558 A | * | 5/1997 | Nitta ....................... B02C 17/22 241/182 |
| 6,110,434 A | * | 8/2000 | Pickens ................ C22B 21/0023 423/127 |
| 6,835,230 B2 | | 12/2004 | Kanno et al. |
| 9,403,167 B2 | | 8/2016 | Watts |
| 9,410,226 B2 | * | 8/2016 | Mitsui ..................... B02C 19/00 |
| 2012/0148461 A1 | | 6/2012 | Rosenberg et al. |
| 2013/0099033 A1 | | 4/2013 | Black et al. |
| 2015/0034747 A1 | | 2/2015 | Watts et al. |
| 2016/0228879 A1 | | 8/2016 | Scharfe |
| 2018/0056344 A1 | * | 3/2018 | Wei ......................... B02C 23/38 |

FOREIGN PATENT DOCUMENTS

| | | |
|---|---|---|
| CN | 105256135 A | 1/2016 |
| CN | 105907974 | 8/2016 |
| GB | 1473008 | 5/1977 |
| GB | 1581418 | 12/1980 |
| KR | 100684356 | 2/2007 |
| RU | 2612162 | 3/2017 |
| WO | 9116984 A1 | 11/1991 |
| WO | 2004005556 | 1/2004 |

OTHER PUBLICATIONS

Mehrota et al. "Mechanical Activation of Gibbsite and Boehmite: New Findings and their Implications", Transactions of the Indian Institute of Metals, Jan. 2016, vol. 69, Issue 1, pp. 51-59.

Rice et al. "Effects of turbomilling parameters on the simultaneous grinding and ferric sulfate leaching of chalcopyrite", Report of Investigations 9351, 1991, United States Department of the Interior, Bureau of Mines.

Mohammadabad, FK, "Mechanochemical Leaching of Chalcopyrite Concentrate by Sulfuric Acid", International Journal of Minerals, Metallurgy and Materials, vol. 23, No. 4, Apr. 2016, pp. 380-388, sections 2.2 & 3.4.

* cited by examiner

```
COMBINED ATTRITION AND LEACHING
              |
          SEPARATION
```

FIG. 1

```
BASIC COMBINED ATTRITION AND LEACHING
              |
ACIDIC COMBINED ATTRITION AND LEACHING
              |
          SEPARATION
```

FIG. 2

COMBINED GRINDING AND LEACHING APPARATUS FOR ORES AND WASTES AND METHODS OF USE THEREOF

CROSS-REFERENCE TO RELATED APPLICATION

This application is a divisional of U.S. Non-Provisional application Ser. No. 16/009,336 filed Jun. 15, 2018, which claims priority to and the full benefit of Great Britain Patent Application 1709612.4 filed Jun. 16, 2017, the entire contents of which applications are incorporated herein by reference.

TECHNICAL FIELD

The present specification generally relates to ores and wastes processing and more particularly to apparatuses and methods for grinding of the ores and wastes, and optionally leaching metals from the ores and wastes. More specifically, the present disclosure relates to an apparatus for the grinding or comminution of ores, mine wastes and radioactive wastes, and corresponding methods.

BACKGROUND

Important needs for the mining industry in relation to actinide elements (U and Th) are the management of radioactive mine wastes and the separation of actinide elements during rare earth elements (REE) production. In Canada, the wastes inventory at the end of 2010 reached 214 million tons of uranium tailings and 174 million tons of U mining waste rock (LLRWMO, 2012). Radioactive elements of uranium and thorium are usually associated with rare earth deposits. Conversely, uranium ores often contain significant concentration of rare earth elements. The separation of U and Th from rare earths is often a big concern in the rare earth industry in order to manage use and extraction of radioactive nuclides (Zhu et al., 2015). Due to recent increases in both uranium and rare earth element prices, there is renewed interest in uranium and rare earth mine sites for developing new ore bodies as well as re-processing the historic waste rock piles and tailings impoundments. Therefore, extracting the uranium would be advantageous for decreasing the long-term radioactivity of wastes and, consequently, the cost of the long-term disposal process. Consequently, there are safety and economic incentives for the extraction of metals before subjecting radioactive cemented wastes to a stabilization process.

The technology for recovering uranium from its most common ores is well established and a vast amount of information is available in the technical literature (e.g. Merritt, 1971; Wilkinson, 1962). Uranium is normally leached from its ores with sulfuric acid, separated from impurities using solvent extraction or ion exchange, and precipitated with magnesium or ammonium hydroxide to yield a commercial product, known as "yellow cake". Extraction of rare earth elements is also well established. The extractive metallurgy of rare earth elements from monazite sand, bastnasite ore, and phosphate rock of igneous origin was described by Habashi (2013). This includes mineral beneficiation, leaching methods, fractional crystallization, ion exchange, solvent extraction, precipitation from solution, and reduction to metals. By contrast, cemented radioactive wastes differ significantly from common ores and have a unique mineralogy, a high alkaline nature, a relatively low U grade, and a high content of Ca (~35%), $SiO_2$ (~20%) and Hg (~1,500 ppm). The composition of the radioactive wastes poses significant impediments to the extraction and recovery of metals using conventional technologies. The high Ca content will interfere with both carbonate leaching and sulfuric acid leaching by forming large amounts of $CaCO_3$ and $CaSO_4$, respectively. Furthermore, the high silica content of the cemented radioactive wastes may lead to the formation of colloidal silica, which is known to create severe problems in hydrometallurgical circuits (Queneau and Berthold, 1986).

A process, using sulphuric acid and potassium iodide, was developed for actinides and lanthanides recovery from nuclear wastes, mine wastes and rare earth elements ores (Reynier et al., 2015; Reynier et al., 2016). The optimization of the grinding and leaching processes is an important step towards the green processing of ores and wastes. There is a need to increase leaching and grinding efficiencies, reduce process steps and energy consumption, simplify equipment, and reduce both the capital expenditure and the operational expenditure (CAPEX/OPEX). It is submitted that combining grinding and leaching in a single apparatus would present these advantages.

A known apparatus for improved grinding is the attrition mill which was initially developed by Dr. Andrew Szegvari in 1945 and large production units are now available for wet, dry and even cryogenic grinding. In this apparatus, grinding is achieved by a random agitation of a grinding media (steel balls) in a stationary tank (grinding chamber) by means of rotating shaft and arms. Grinding occurs mainly through shearing among the particles themselves and/or in interaction with the grinding media. Finer material is usually obtained by attrition in comparison to other mechanical grinding mechanisms such as impact and compression.

The attrition mill technology may be selected for optimization of the grinding and leaching processes in radioactive waste fragmentation. Known attempts, using grinding media, have been made for example in U.S. Pat. No. 5,007,589, CA 2,022,300, U.S. Pat. Nos. 4,242,129, 6,835, 230, WO 2004/005556, U.S. Pat. No. 2,137,051 and US 2013/0099033. There is a wide variety of disadvantages and challenges related to the known techniques for grinding ores or wastes, and metals leaching from ores and wastes. There is indeed a need for a technology that overcomes at least some of the disadvantages of the known methods in the field.

In radioactive waste processing, grinding media can hardly be separated from the pulp after grinding and can neither be disposed with the residual waste as it would increases significantly the weight and/or volume of the waste and the cost for long term storage. Moreover, the possibility of using a removable and less sturdy grinding chamber, which could serve for unmolding the waste form its container before grinding and subsequently for lixiviation and as a disposal vessel would be a beneficial advantage. Such a combined process would avoid pulp transfer among processes and the related risk of contamination, which must be minimized in any radioactive waste processes.

In rare earth processing, grinding in the absence of grinding media may also provide some advantages if satisfactory lixiviation efficiency can be achieved at a larger grain size. A ratio of grinding media to the ore is usually more than 15 to 1, and a lot of grinding energy is therefore used for agitating the media itself within the grinding chamber. The energy embodied in the wearing and replacement of the grinding media adds another 33% to the grinding energy. Grinding in the absence of grinding media requires less energy and entrains important cost savings and reduction of GHG emissions in the mining industry considering that grinding energy represents 90% of the energy used in rock fragmentation, 40% of the energy used in open-pit and 3% of world electrical energy. The impact on mine production and footprint reduction is also important considering in addition the space occupied by the grinding media in the grinding chamber. Frequency of liner replacement, which causes 50% of the mill downtime, may also be reduced significantly in the absence of grinding media.

Grinding at a coarser grind may provide some important environmental benefits considering that water retention is less in a coarse grain tailing pond, and the eventual damage caused to the neighborhood by a tailings pond leakage would be then be reduced significantly. However, there is a general expectation in the art that grinding media are required in many circumstances to achieve a desired degree of grinding or communition of ores, mine wastes etc.

In view of the above, there is a need for improvements in apparatuses for grinding or comminuting of ores, wastes and earth substrates, and corresponding methods.

SUMMARY

The present specification responds to the above need by providing an apparatus for grinding or comminuting of ores, substrates and wastes such as mining wastes and radioactive wastes. Also disclosed are corresponding methods for grinding and comminuting ores, mine wastes, and radioactive wastes including those comprising metals such as uranium and/or cesium and/or mercury and/or thorium and/or rare earth elements, and optionally for dissolution of these from ores and wastes. Advantageously, though not necessarily, such apparatuses and methods may permit grinding and comminution without the need, or with reduced need, for grinding media.

Exemplary embodiment (1) provides an apparatus for grinding or comminuting a metal-containing ore, substrate, mine waste, or radioactive waste, the apparatus comprising:
  a. a container comprising inner walls that define an open end and a closed end for the container, and a lumen for retaining the ore, with two or more elongate ribs projecting inwardly from the walls and extending from the closed end towards the open end of the container;
  b. a powered, rotatable spindle extending into and axially aligned with the container, substantially equidistant from side walls of the inner walls of the container;
  c. a plurality of grinding arms arranged about and extending from the spindle such that each comprises at least one free end that passes with a clearance of from 0.01 mm to 20 mm from each of the ribs on the inner walls of the container, as the spindle is rotated; and
  d. a motor to drive axial rotation of the spindle and attached grinding arms within the container,
  wherein the apparatus grinds or comminutes the metal-containing ore, substrate or mine waste by grinding and attrition optionally absent grinding media.

Exemplary embodiment 2 provides the apparatus of exemplary embodiment 1, wherein each grinding arm extends through and extends upon each side of the spindle such that each grinding arm comprises two free ends that each pass with a clearance of from 0.01 mm to 20 mm from each of the ribs on the side walls of the container, as the spindle is rotated.

Exemplary embodiment 3 provides the apparatus of exemplary embodiment 1, wherein successive grinding arms are arranged helically about the spindle such that each successive grinding arm extends at an acute angle from the axis of the spindle relative to its adjacent grinding arm on the spindle, and all grinding arms extend about 90 degrees from an axis of the spindle.

Exemplary embodiment 4 provides the apparatus of exemplary embodiment 1, wherein each grinding arm extends about 90 degrees from each adjacent grinding arm along the spindle, and all grinding arms extend about 90 degrees from an axis of the spindle.

Exemplary embodiment 5 provides the apparatus of exemplary embodiment 1, wherein the grinding arms are at least substantially uniformly elliptical in cross-section, or at least substantially uniformly circular in cross-section, and optionally the grinding arm or arms adjacent the closed end of the container have a substantially square or rectangular cross-section.

Exemplary embodiment 6 provides the apparatus of exemplary embodiment 1, wherein the spindle and attached grinding arms are movable axially relative to the container such that the spindle and grinding arms can be removed from the container, optionally by a telescoping attachment arm.

Exemplary embodiment 7 provides the apparatus of exemplary embodiment 1, wherein the container comprises three or more ribs, at least a portion of which are arranged at least substantially parallel to one another in a radially symmetric manner about the inner walls of the container.

Exemplary embodiment 8 provides the apparatus of exemplary embodiment 7, wherein the container defines a cylindrical lumen and the side inner walls comprise six ribs arranged parallel to one another, at least a portion of which extend a length of the side inner walls from the closed end to the open end of the container, in a radially symmetrical arrangement 60 degrees apart about the axis of the container.

Exemplary embodiment 9 provides the apparatus of exemplary embodiment 1, wherein the inner walls of the container define a cylindrical lumen for the container, defined by a continuous, cylindrical side wall portion extending between the open and closed ends of the container, and a substantially circular floor portion at the closed end of the container, the elongate ribs extending such that they radiate from a centre of said circular portion and continue with a substantially parallel arrangement along said cylindrical side wall portion from the closed end to the open end of the container.

Exemplary embodiment 10 provides the apparatus of exemplary embodiment 1, wherein the plurality of grinding arms comprises from 2 to 20 grinding arms.

Exemplary embodiment 11 provides the apparatus of exemplary embodiment 1, wherein clearance between the free ends of the grinding arms and the ribs is from 0.1-5 mm.

Exemplary embodiment 12 provides the apparatus of exemplary embodiment 9, wherein the grinding arms comprising one or more grinding arms that extend from a free-end of the spindle, which during operation and rotation of the spindle pass adjacent the portion of the elongate ribs that radiate from a centre of the substantially circular floor portion at the closed end of the container, with a clearance of from 0.5-10 mm, preferably less than 5 mm, preferably less than 3 mm.

Exemplary embodiment 13 provides the apparatus of exemplary embodiment 1, wherein the powered, rotatable spindle and/or the grinding arms comprise one or more magnets for collecting magnetic metal components of the ore, substrate or mine waste.

Exemplary embodiment 14 provides the apparatus of exemplary embodiment 1, further comprising air flotation means to add pressured air into the ore, substrate or mine waste being processed, the air flotation means comprising air channels extending within at least some of the grinding arms, each of which exits at least part way along its respective grinding arm, and an air pump to force air through the air channels and out of the grinding arms during rotation of the spindle.

Exemplary embodiment 15 provides for a use of the grinding or comminuting apparatus of any one of exemplary embodiments 1 to 14, for grinding or comminuting a metal-containing ore, substrate or mine waste.

Exemplary embodiment 16 provides for a method for grinding or comminuting a metal-containing ore, substrate, mine-waste, or radioactive waste, comprising the steps of:
  a. adding the metal-containing ore, substrate or mine waste to the container of the apparatus of any one of exemplary embodiments 1 to 14;
  b. optionally adding a grinding media to the container;
  c. applying power to the motor thereby to rotate the spindle and attached grinding arms;
wherein steps a. and b. if present may be performed in any order.

Exemplary embodiment 17 provides the method of exemplary embodiment 16, further comprising a step of adding to the metal-containing ore, substrate or mine waste, either before, together with or after step a., an aqueous inorganic acid at a concentration of between about 1M and about 9M, at a temperature of less than about 100° C., to solubilize at least a portion of the at least one metal, thereby to produce a mixture of a metal-rich leachate and a metal-poor ore or waste.

Exemplary embodiment 18 provides the method of exemplary embodiment 16 or 17, wherein the metal comprises uranium, cesium, mercury, thorium, rare earth elements, or combinations thereof.

Exemplary embodiment 19 provides the method of exemplary embodiment 16 or 17, wherein the waste is a cemented radioactive waste or a radioactive mine waste.

Exemplary embodiment 20 provides the method of exemplary embodiment 17, wherein the inorganic acid comprises sulfuric acid, nitric acid, hydrochloric acid, phosphoric acid, mixtures thereof, or combinations of inorganic acid and salts thereof.

Exemplary embodiment 21 provides the method of exemplary embodiment 17, further comprising, either before or after the adding of the aqueous inorganic acid, a step of adding an aqueous inorganic base with the addition of water, or with an aqueous organic base at a concentration of from about 1M to about 7.5M, to solubilize at least a portion of the at least one metal providing an aqueous mixture.

Exemplary embodiment 22 provides the method of exemplary embodiment 17 or 21, further comprising a step of: separating the mixture of a metal-rich leachate and a metal-poor ore or waste.

Exemplary embodiment 23 provides the method of exemplary embodiment 15 or 16, further comprising addition of a leaching salt, wherein the leaching salt comprises a halogen salt such as potassium iodide or a mercury salt such as mercury nitrate, or any combination thereof.

Exemplary embodiment 24 provides the method of any one of exemplary embodiments 16 to 23, wherein the method is performed absent any grinding media.

Certain other exemplary embodiments provide a process for combined grinding and leaching of at least one metal from ore or waste comprising the at least one metal, the process comprising:
a) a combined attrition and leaching step comprising grinding and mixing the ore or waste with an aqueous inorganic acid at a concentration between about 1 M and about 9 M, at a temperature lower than about 100° C., to solubilize at least a portion of the at least one metal, thereby producing a mixture of a metal-rich leachate and a metal-poor ore or waste; and
b) a separation step comprising separating the metal-rich leachate and the metal-poor ore or waste.

Other exemplary embodiments provide s process for combined grinding and leaching of at least one metal from ore and waste comprising the at least one metal, the process comprising:
a) a basic combined attrition and leaching step comprising grinding and mixing the ore or the waste with a solid inorganic base with the addition of water, or with an aqueous inorganic base at a concentration between about 1 M and about 7.5 M, to solubilize at least a portion of the at least one metal providing an aqueous mixture;
b) an acidic combined attrition and leaching step comprising grinding and mixing the ore or waste with an aqueous inorganic acid at a concentration between about 1 M and about 9 M, at a temperature lower than about 100° C., to solubilize at least a portion of the at least one metal thereby producing a mixture of a metal-rich leachate and a metal-poor ore or waste; and
c) a separation step comprising separating the metal-rich leachate and the metal-poor ore or waste.

Additional embodiments, aspects and features of the invention will be described and defined herein.

BRIEF DESCRIPTION OF THE DRAWINGS

FIG. 1 is a flow chart to illustrate a process according to one embodiment.

FIG. 2 is a flow chart of a process according to another embodiment.

DEFINITIONS

Figure 3:
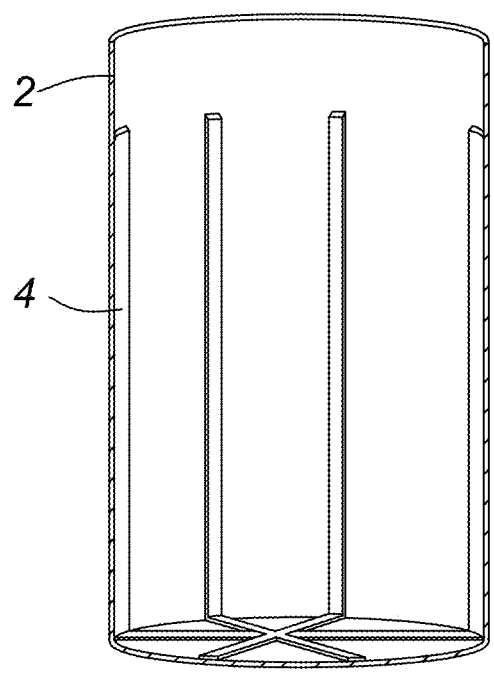
FIG. 3 illustrates a side view of a container portion of an example apparatus.
Figure 4:
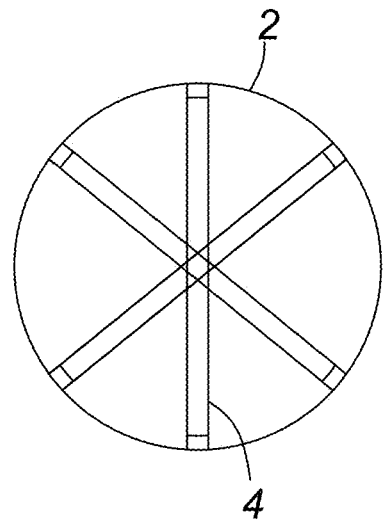
FIG. 4 illustrates a top view of a container portion of an example apparatus.

"About", when qualifying the value of a variable or property—such as concentration, temperature, pH, particle size and so on—means that such variable or property can vary within a certain range depending on the margin of error of the method or apparatus used to evaluate such variable or property. For instance, the margin of error for temperature may range between ±1° C. to ±5° C.

"Attrition", when pertaining to the solid waste (e.g. earth substrate, mine waste, rocks, optionally comprising water), means subjecting the waste to agitation to induce physical wear of the waste and separation into smaller waste particles. Attrition may also aid in desorbing fine waste particles from larger waste particles. The attrition may sometimes help enable diffusion of the metals from the waste fractions and/or fine waste particles into the aqueous solution. The attrition sometimes may include techniques such as milling. An attrition step may be performed in conjunction with other actions, such as contacting the waste with water, and the contacting step may include soaking, batch mixing, trickling, spraying, continuous flow-by, or various combinations of such contacting techniques.

"Contacting", when pertaining to the ore or waste and an aqueous inorganic acid, means that those elements contact each other so as to enable diffusion of the metals from the waste phase into the acid solution phase. The "contacting" will often be referred to as leaching herein and may include techniques such as soaking, batch mixing, trickling, spraying, continuous flow-by, or various combination of such contacting techniques.

"Inorganic acid" means an acid lacking a carbon atom and may be a sulfuric acid nitric acid, hydrochloric acid, mixtures thereof, or a combination of acids and corresponding salts. It should also be understood that the inorganic acid may be a used or recycled acid.

"Inorganic base" means a hydroxide of alkali metals, or alkaline earth metals or a molecule that has the ability to accept an electron. Inorganic base examples may include sodium hydroxide, potassium hydroxide, calcium hydroxide, sodium carbonate, ammonia, or a combination thereof.

"Leaching Salt" means an ionic compound and may be a halogen salt, such as iodine, chlorine, fluorine, bromine, or any combination thereof. The leaching salt may be a mercury salt, such as mercury nitrate, mercury chloride, mercury iodide, mercury iodate, or any combination thereof.

"Metals" means the elements of interest which are included in the ores, mine wastes or radioactive wastes and for which there are safety and economic incentives for their extraction. Metals may for example include but are not limited to uranium, thorium, cesium, mercury, rare earth elements, a combination thereof and/or other metal species.

"Metals-rich solution" means a solution containing the metals removed from the ore or waste during a leaching step. It should also be understood that for subsequent treatment of the solution to remove or recover metals, the metals-rich solution from the initial step may be combined with solutions from other leaching or washing steps to form an overall metals-rich solution. Thus, the metals-rich solutions may be combined with other streams, or be subjected to various other steps before it is treated to recover one or more of the metals.

"Mine waste" means a waste, which was produced during mining operations or related to mining activities. It should be understood that the mine waste might be radioactive or mixed with a non-radioactive waste at various points in the process in order to form an overall waste to meet certain governmental or environmental standards.

"Radioactive waste" means a radioactive waste that may be in any state, liquid, solid, granular, or powder form and so on. It should be understood that the radioactive waste might be mixed with a non-radioactive waste at various point in the process in order to form an overall waste quantity to meet certain governmental or environmental standards.

"Radioactive cemented waste" means a radioactive waste, which has at some time been in contact with a cement to thereby become "cemented".

"Rare Earth Elements" (REE) means a compound containing at least one element of the rare earth elements (Scandium, Yttrium, Lanthanum, Cerium, Praseodymium, Neodymium, Promethium, Samarium, Europium, Gadolinium, Terbium, Dysprosium, Holmium, Erbium, Thulium, Ytterbium, Lutetium) and may include solubilized ions, complexes, derivatives, isomers, as the case may be. For instance, the term "Rare Earth" may include one of the light rare earth LREE ($La_2O_3$, $CeO_2$, $Pr_6O_{11}$, $Nd_2O_3$) and/or one of the heavy rare earth HREE ($Sm_2O_3$, $Eu_2O_3$, $Gd_2O_3$, $Tb_4O_7$, $Dy_2O_3$, $Ho_2O_3$, $Er_2O_3$, $Tm_2O_3$, $Yb_2O_3$, $Lu_2O_3$, $Y_2O_3$) in association with other elements or solubilized in an aqueous medium. Thus, these elements should be read with a mind to their relationship with the process steps, process conditions and other interacting compounds.

"Uranium" (U), "cesium" (Cs), "mercury" (Hg), "thorium" (Th), unless specified otherwise, each means a compound containing the given element and may include solubilized ions, complexes, derivatives, isomers, as the case may be. For instance, the term "uranium" may include uranium (IV) and uranium (VI); "cesium" may include cesium in association with other elements or solubilized in an aqueous medium; while "mercury" may include the element in association with sulfur or oxygen, solubilized, or in its pure metallic form upon dissolution. Thus, these elements should be read with a mind to their relationship with the process steps, process conditions and other interacting compounds.

DETAILED DESCRIPTION OF SELECTED EXEMPLARY EMBODIMENTS

Embodiments of the present disclosure include an apparatus for grinding or comminuting, as well as optionally leaching, of ores, mine wastes and radioactive wastes. Therefore, selected embodiments provide an attrition mill for grinding and attrition of ores. In certain such embodiments the apparatus may be so effective or efficient that such ores and related substrates may undergo useful grinding without necessarily requiring the presence, the expense or inefficiency of using grinding media. In turn this makes the apparatuses defined herein especially useful for grinding an comminuting of radioactive ores and wastes, and the resulting output or product from the apparatus is not complicated by a presence of the grinding media that may have been made radioactive by the grinding process (and thus difficult to separate and dispose of). This in turn makes the apparatuses, and corresponding methods that employ the apparatuses, more efficient and effective, since down-times for lining replacements are reduced, larger quantities of ore may be ground (without the bulk of the grinding media) and there is no need or requirement to separate the grinding media from the ground ore or radioactive waste after grinding is completed, as is the case for batch processes and most laboratory experiments. Further embodiments include the use of such apparatuses, and corresponding methods that employ the apparatuses.

In the following detailed description section, specific embodiments are described. However, to the extent that the following description is specific to a particular embodiments or particular uses they are intended for exemplary purposes only and simply provide a description of exemplary embodiments. Accordingly, the specification is not limited to the specific embodiments described below, but rather, includes all alternatives, modifications, and equivalents falling within the scope of the present specification.

At the outset, for ease of reference, certain terms used in the present specification and their meanings as used in this context are set forth. To the extent a term used herein is not defined below, it should be given the broadest definition persons in the pertinent art have given that term as reflected in at least one printed publication or issued patent. Further, the present specification is not limited by the usage of the terms shown below, as all equivalents, synonyms, new developments, and terms or techniques that serve the same or a similar purpose are considered to be within the scope of the present specification.

In one embodiment, a process for combined grinding and leaching of at least one metal from ores or wastes, including radioactive wastes and mine wastes in one step has been developed. The process may comprise a combined attrition and leaching step, and a separation step. The combined attrition step and leaching step may comprise grinding and mixing of ore or waste with an aqueous inorganic acid to solubilize at least one metal present in the ore or waste. Preferred metals for recovery or separation may include uranium, cesium, mercury, thorium and rare earth elements, or any combination thereof.

The aqueous inorganic acid may preferably be in a concentration from about 1 M to about 9 M. The inorganic acid may be sulfuric acid, nitric acid, hydrochloric acid, phosphoric acid, or any mixtures thereof, or may also be a combination of inorganic acid and corresponding salts. The inorganic acid may be used acid or recycled acid. Preferably, the inorganic acid is sulfuric or nitric acid.

The combined attrition and leaching step with the aqueous inorganic acid may be performed with a leaching salt. For example, the leaching salt may be a halogen salt, such as iodine, chlorine, fluorine or bromine, or any combination thereof. The leaching salt may be a mercury salt, such as mercury nitrate, mercury chloride, mercury iodide, mercury iodate, or any combination thereof. Preferably, the leaching salt is potassium iodide or mercury nitrate, or any combination thereof. The salt may be in a concentration between about 0.01 M and about 1 M.

The combined attrition and leaching step may preferably be carried out at a temperature lower than about 100° C. to solubilize at least a portion of the at least one metal present in the ore or waste. Mixing may be carried out for a period sufficient to solubilize the metals, for example from about 0.1 h to about 24 h, preferably from 0.1 h to 2 h. A metal-rich leachate and a metal-poor ore or waste may be formed from the combined grinding and leaching step. The metal-rich leachate and the metal poor ore or waste may be separated for further processing to recover the metal. The separation step may be performed by any known methods such as ion exchange, solvent extraction, precipitation, membrane separation, or the like techniques known in the art of combinations thereof.

Optionally, the ore or waste may be crushed or screened according to any known methods to reduce the particle size of the ore or waste. For example, it may be reduced to a particle size inferior to about 15 cm, or preferably to a particle size inferior to about 15 mm.

Optionally, the amount of water and/or the amount of ore or waste that are mixed together during the combined attrition and leaching step may be adjusted to obtain an aqueous mixture having an ore or waste concentration between about 50 g/L and about 500 g/L of the total mixture.

The process for combined grinding and leaching may optionally be performed without the use of grinding media. Grinding in the absence of grinding media represents considerable advantages since it requires less energy and entrains important cost saving and reduction of GHG emissions. Grinding media are hard to separate from the pulp after grinding, especially in batch processes, and can neither be disposed with the residual waste. The impact on mine operations and carbon footprint reduction is also important considering the space occupied by the grinding media in the grinding chamber and wear on the equipment.

According to another embodiment of the process, the combined attrition and leaching step may be repeated to include multiple sequential steps. The multiple combined attrition and leaching steps may use the same or different conditions, for example the same or different inorganic acid, the same or different concentration of inorganic acid, the use of a leaching salt being the same or different, etc.

Furthermore, the process may comprise a washing step of the separated metal-poor ore or waste to remove residual metals. The washing step may comprise any known method for removing residual metals. Optionally, the washing step may comprise filtering the separated metal-poor ore or waste to provide solids, rinsing or mixing the solids with a washing solution and performing a solid-liquid separation to provide washed solids and spent washing waters. The washing solution may comprise water, a diluted acid solution, an acid solution, or the like. The washing step may be performed multiple times, if required. The spent washing waters may be used in a subsequent process for combined grinding or leaching or any other process for the treatment of ore and waste.

Other embodiments also provide a process for combined grinding and leaching comprising a basic combined attrition and leaching step, an acidic combined attrition and leaching step, and a separation step.

The basic combined attrition and leaching step may comprise grinding and mixing the ore or waste with an inorganic base. The inorganic base may be in a solid form and used with water, or it may be in the form of an aqueous solution preferably in a concentration from about 1 M to about 7.5 M. The inorganic base may include sodium hydroxide, potassium hydroxide, calcium hydroxide, sodium carbonate, ammonia, or a combination thereof. The inorganic base may be used base or recycled base. Preferably, the inorganic base is sodium hydroxide. The basic combined attrition and leaching step may be carried out for about 0.01 hour to about 1 hour.

The acidic combined attrition and leaching step may be the same as previously described, and may be performed multiple times, using the same or different conditions. The separation step may also be as defined above.

Example summaries of selected methods are illustrated in the flow charts shown in FIGS. 1 and 2. FIG. 1 illustrates one method comprising a first step of combined attrition and leaching, and a second step of separation of the leachate and the ore. FIG. 2 illustrates another method comprising a first step of basic combined attrition and leaching, a second step of acidic combined attrition and leaching, and a third step of separation of the leachate and the ore.

The processes for combined grinding and leaching defined above may be operated in a modified attrition mill, or any known apparatus in the art.

Selected embodiments further provide for an apparatus for conducting a process for grinding, or optionally combined grinding and leaching, of ore or waste materials. Any of the methods and processes described herein, in part or in full, may be conducted within, or with the assistance of, an apparatus as described herein.

Preferably, the apparatus is an attrition mill as described herein. The attrition mill may comprise a grinding container or chamber, deviation bars, also termed elongate ribs, on or protruding from the wall and/or the walls of the grinding container or chamber, a rotatably mounted shaft provided with a plurality of laterally extending grinding/attrition arms. The number of grinding/attrition arms, their shape, length and relative configuration may be selected for optimization of grinding efficiency and minimization of mill vibration. The shaft may be inserted into the grinding chamber and operatively connected to a motor for providing grinding and mixing of the mixture within the grinding chamber.

The deviation bars may be used to generate additional disturbances and shearing forces in the grinding process and in some embodiments may assist in the grinding of the waste even in the absence of grinding media.

In some embodiments, the grinding container or chamber may be disposable or replaceable. In yet another embodiment, the apparatus may comprise an integrated air flotation system as herein described. The air flotation system may assist separation of the metal from the ore or waste.

An exemplary apparatus is provided in FIGS. 3 to 7, where an attrition mill comprises a disposable container or grinding chamber 2 equipped with deviation bars or elongate "ribs" 4 installed on and projecting from the inner wall and/or the floor surfaces of the container 2. In the embodiment illustrated the specifications of the exemplary modified attrition mill apparatus of the designed disposal grinding chamber were as follow: 1) external diameter: 610 mm; 2) wall thickness: 8 mm; 3) shaft 6 diameter: 65 mm and 4) deviation bars (also known as elongate ribs) 4: size 300× 19×6 mm (L×D×T). The resulting clearance between shaft 6 and its attached deviation bars, and grinding chamber 2, is 3 mm at the bottom and 11.5 mm on the side.

Two dominant breakage mechanisms take place in this equipment: breakage by impact and breakage by attrition. The larger blocks or chunks of ore first break by impact either among themselves and/or against the deviation bars as they are moved by the grinding/attrition arms within the grinding chamber. As the blocks get smaller they are trapped at the bottom of the grinding chamber between the "lower-most" grinding/attrition arm(s) and the deviation bars or ribs 4 extending on a floor surface of the container 2, where they become further reduced in size by attrition. The clearance between the "lower-most" grinding/attrition arm(s) and the deviations bars in part controls the size distribution of the end product. A clearance that is too small (e.g. smaller than 3 mm) is not recommended for some ores or waste materials, at least in some embodiments, as it may increase the risk of bars bending and blockage of the mixer. However, disclosed embodiments are not limited in this regard. The size of the deviations bars can also be varied. They are designed for introducing minimum degrees of turbulence that is required for breaking the larger blocks by impact/grinding. In selected embodiments, the design of the deviation bars or ribs avoids larger perturbation of the flow, which can be detrimental to the operation of the grinding mill.

One potential identified problem is the trapping of the blocks between the grinding/attrition arms.

A number of experiments have shown that, under standard material conditions, the dimensions of the shaft and the number of grinding/attrition arms may have limited impact on the product size distribution and the efficiency of the grinding mill. The spacing among the bars however is preferably sufficiently large for avoiding trapping of the larger blocks within the shaft arm, which reduces their grinding efficiency and even stops their size reduction. Based on this observation the number of mixer arms may, at least in some but not all exemplary embodiments, be limited to 8 bars spaced at 4 inches and by an angle of about 40°. The spacing between the "lower-most" grinding/attrition arm(s) may optionally be reduced to 2 inches at the bottom of the grinding chamber where finer blocks accumulate before being further reduced in size by attrition. The "lowermost" grinding/attrition arm(s) form is also of importance: a square or rectangular cross-sectional form is sometimes preferred for increasing the shearing surface and the overall efficiency of the attrition breakage mechanism (best illustrated, for example, in feature 10' of FIG. 7—see below—but also illustrated in other Figures).

It was demonstrated through a number of experiments that the minimal floor and wall thickness of the disposable grinding chamber 2 can, in some selected embodiments, be further reduced to 3 mm. These experiments were done with radioactive waste; a more resistant rock material may eventually require a more resistant and therefore larger wall thickness.

A telescopic head may optionally be provided for moving the attrition unit shown generally at 8 (shaft 6 and attrition arms 10) up and down as required, and to allow the displacement (or e.g. replacement) of the container or chamber, or for servicing of the attrition unit. Operating conditions were developed accordingly for lowering progressively the shaft 6 of the attrition unit 8 in a bed of ore or waste blocks. Rotation speed of the mixer was also increased progressively as needed to avoid unacceptable vibration of the apparatus. In both cases the increased rate was a function of material size and hardness and was therefore experimentally defined for each application. All equipment pieces were made of stainless steel 316 for meeting the lixiviation process requirements. The above specifications were selected for minimization of mill vibration and optimization of the size reduction ratio. It was demonstrated that, at least in some embodiments, the modified attrition mill was able to grind ore and waste blocks from a 80% passing size of about 15 cm down to 4 mm. However, it will be understood that such embodiments are merely exemplary, and others may be included with any modifications necessary within the scope of the present disclosure.

Figure 7:
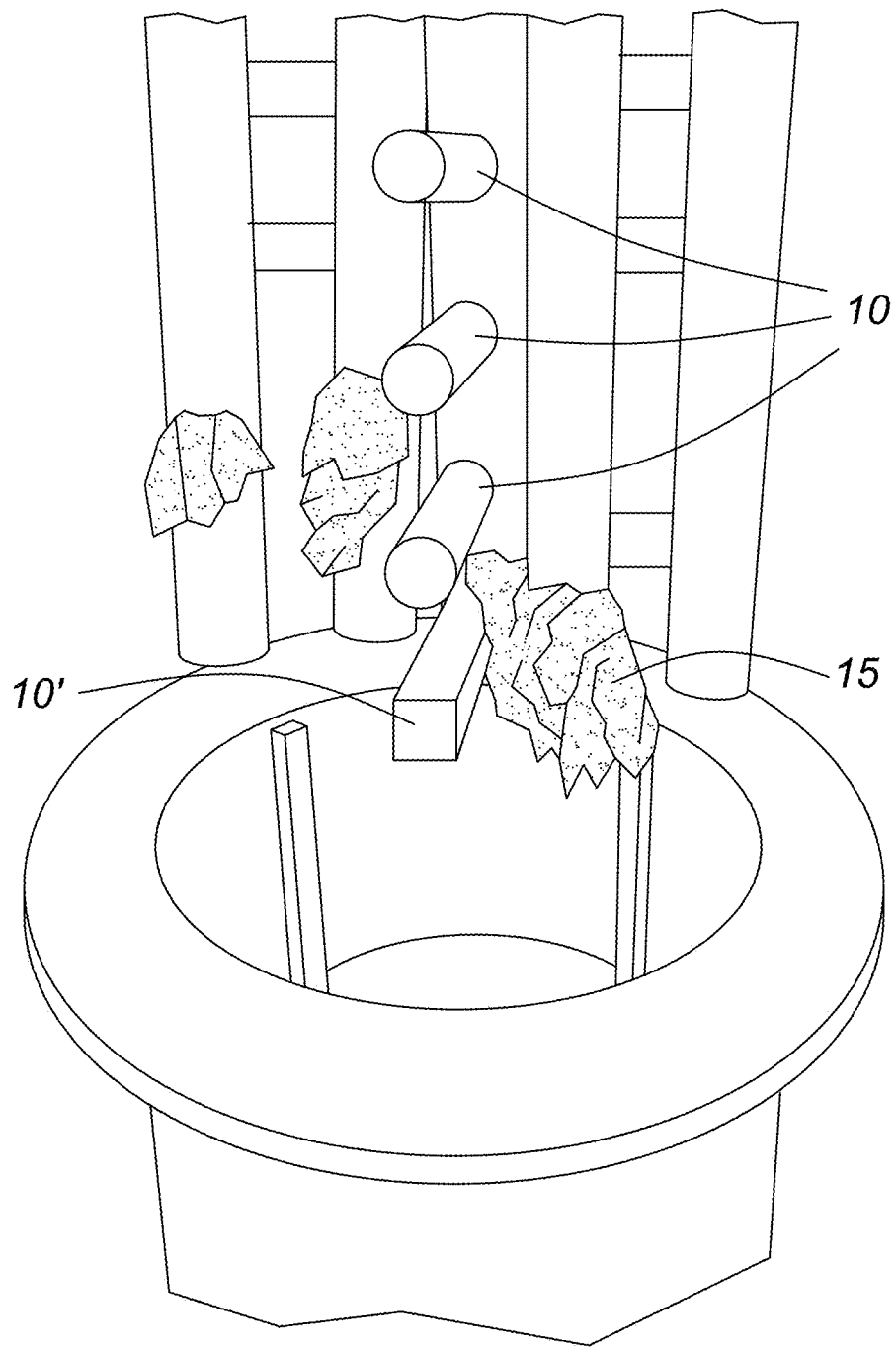
FIG. 7 illustrates a side view of an attrition unit portion of an example apparatus comprising magnetized metal bars.

In further exemplary embodiments, a magnetic separator (see FIG. 6), made for example of neodymium magnets 14, may be attached to the shaft arm assembly of the mixer, which was designed at the laboratory scale and successfully tested at the pilot scale. The magnets were attached to the mixer shaft assembly for increasing the probability of collision of the grinding/attrition arms with metal pieces, fragments or particles in the ore or waste material in the hope of increasing their recovery. A metal recovery of 88% clean at 70% was obtained at the pilot scale. The cleanliness of the metal recovered with the laboratory version of the separator was slightly better at 78%. Two types of magnet arrangements were tested (FIGS. 6 and 7): one consisting of axially magnetized cylinder or bar 14 (FIG. 6) while the other was made of bars magnetized through their thickness (FIG. 7). Both magnet arrangements are shown in FIG. 7. Despite a reduced collection zone, axially magnetized cylinders were found to be somewhat more efficient than metal bars magnetized through their thickness during these initial tests. The magnetic field is maximal at both extremities with the axially magnetized cylinder and this design appears to be well suited for collecting residual iron 15, which appears to concentrate at the bottom of the grinding chamber. Such a behavior of the iron is quite comprehensive considering the low agitation speed in the grinding chamber and the high density of iron. The design of an electromagnet equivalent is simplified and the electromagnet may alternatively be integrated into the shaft arm assembly. Other configurations for integrations of magnets or magnetic systems are also contemplated.

FIG. 7 illustrates a further optional feature that may present certain advantages depending upon the ore or material subjected to grinding in the attrition mill. As illustrated, most of the attrition arms 10 (also herein termed grinding arms) extending from the shaft have a circular or elliptical cross-section. However, as can be seen in the illustration shown in FIG. 7 the "lower-most" pair of arms 10' extending from the shaft nearest the closed end of the container (i.e. nearest the floor of the container) may have a substantially square or rectangular rather than circular or elliptical cross-section. As illustrated, such attrition arms 10' (or grinding arms) have a generally square cross-section with rounded corners (in cross-section). This profile of the lower-most attrition arms adjacent the ribs projecting or protruding on the inside floor of the container or chamber, may help to improve a rate of attrition of the ore or waste, thereby to improve grinding efficiency.

Figure 5:
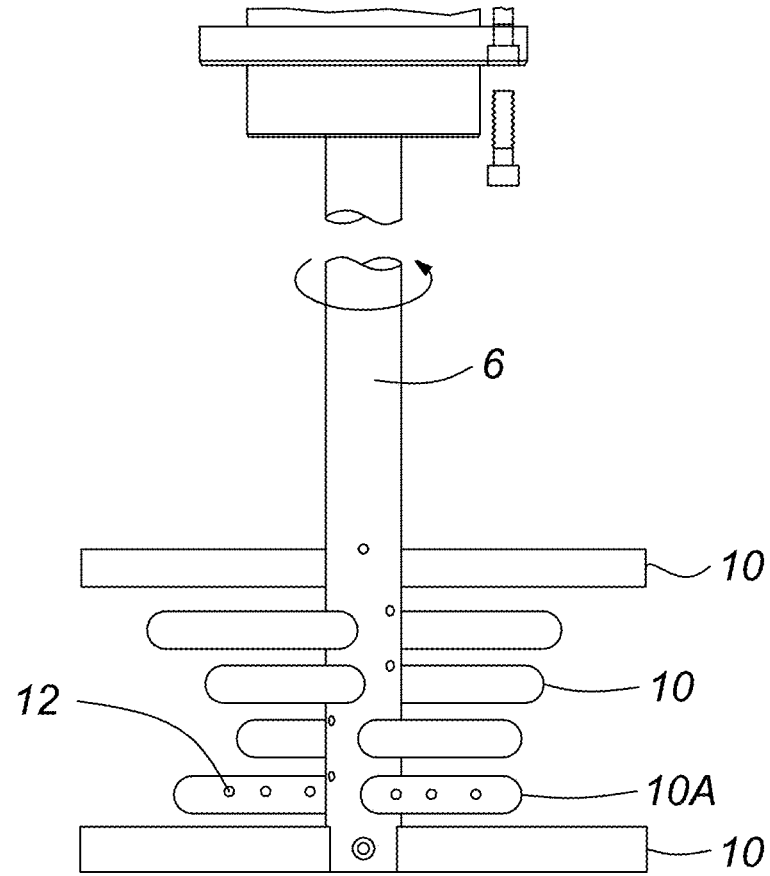
FIG. 5 illustrates a side view of an attrition unit portion of an example apparatus.
Figure 6:
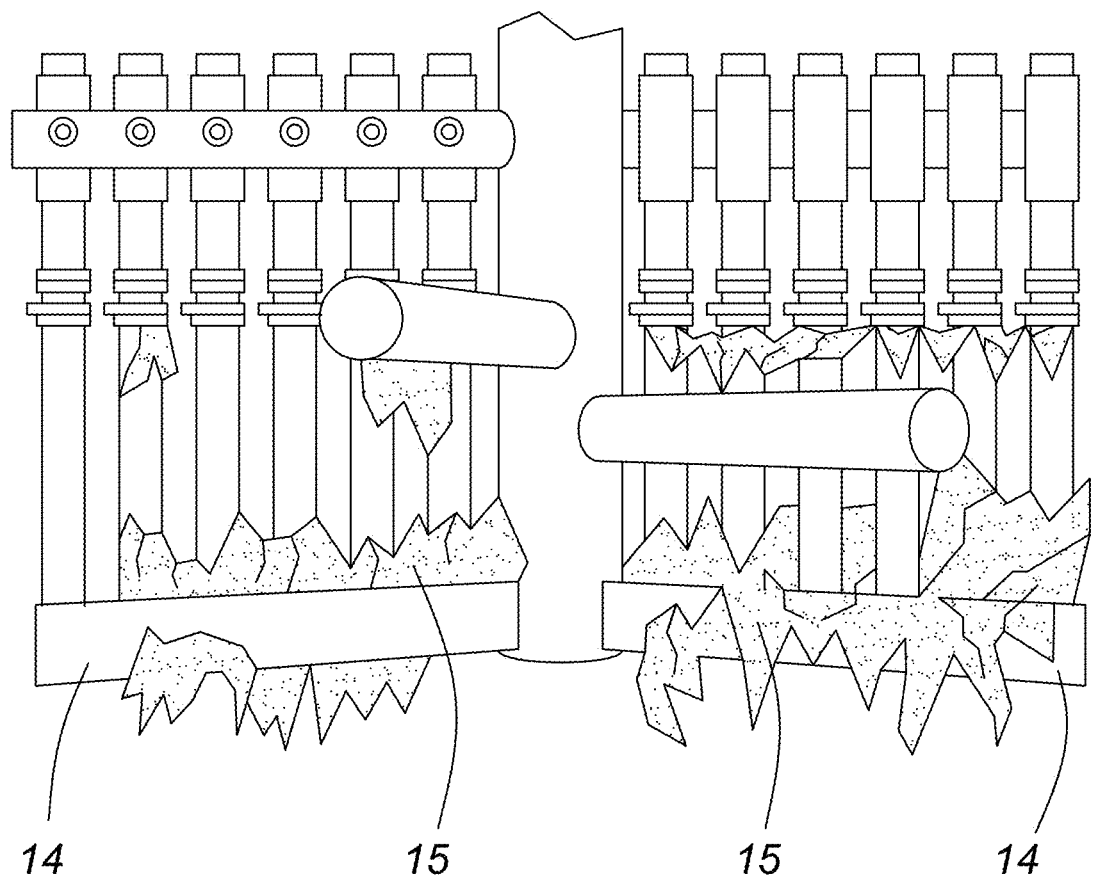
FIG. 6 illustrates a side view of an attrition unit portion of an example apparatus comprising an axially magnetized metal cylinder.

Optionally, an air flotation system may be integrated into the modified attrition mill in order to help separate finely broken pieces of e.g. plastic or to perform flotation of selected minerals (see FIG. 5). In one example modifications as shown for example in FIG. 5 may be as follows: 1) 12 mm diameter hole was drilled within the shaft 6 and the second mixer bottom attrition arm 10A; 2) 10 air diffusers (460 µm) were installed on the mixer second bottom attrition arm 10A as air nozzles 12; 3) air flow was introduced within a seal at the top of the shaft 6 and; 4) a manual valve was installed on the air line for controlling the flow (not shown). An air flotation system may also be used as an air addition unit for the lixiviation process. Air diffusers may also be installed in other portions of the attrition mill as required.

Figure 8:
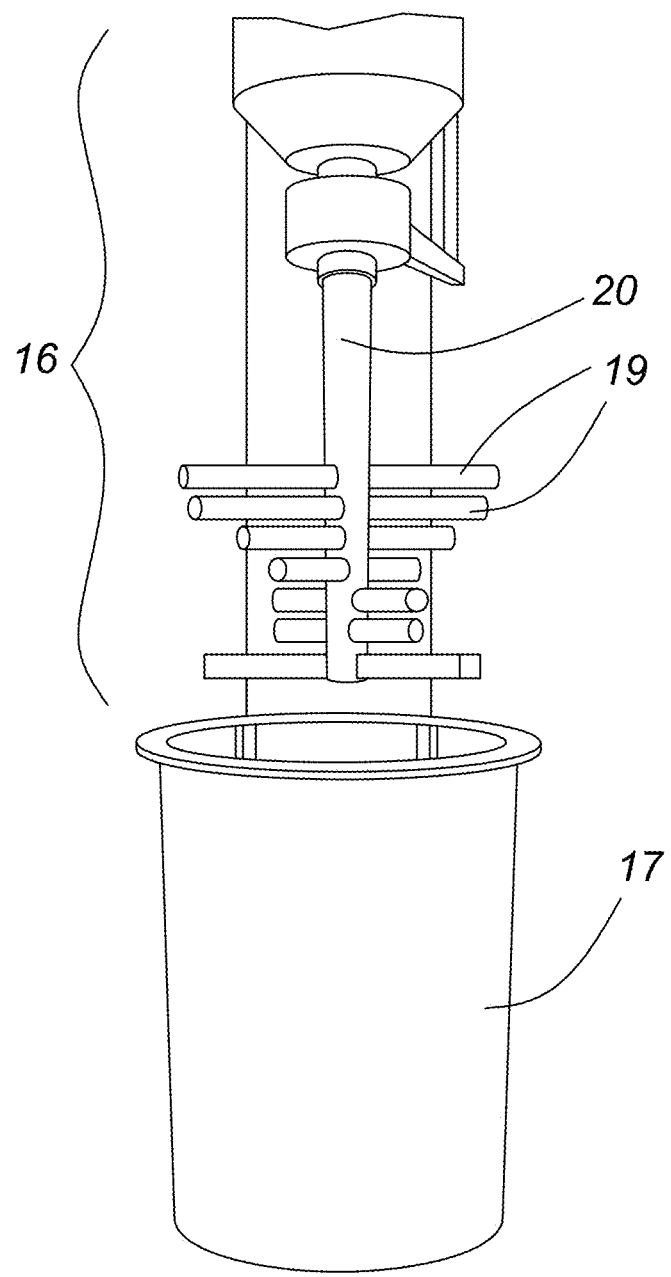
FIG. 8 illustrates a side perspective view of an example apparatus with the attrition mill mixer shaft arm removed axially from the container portion.
Figure 9:
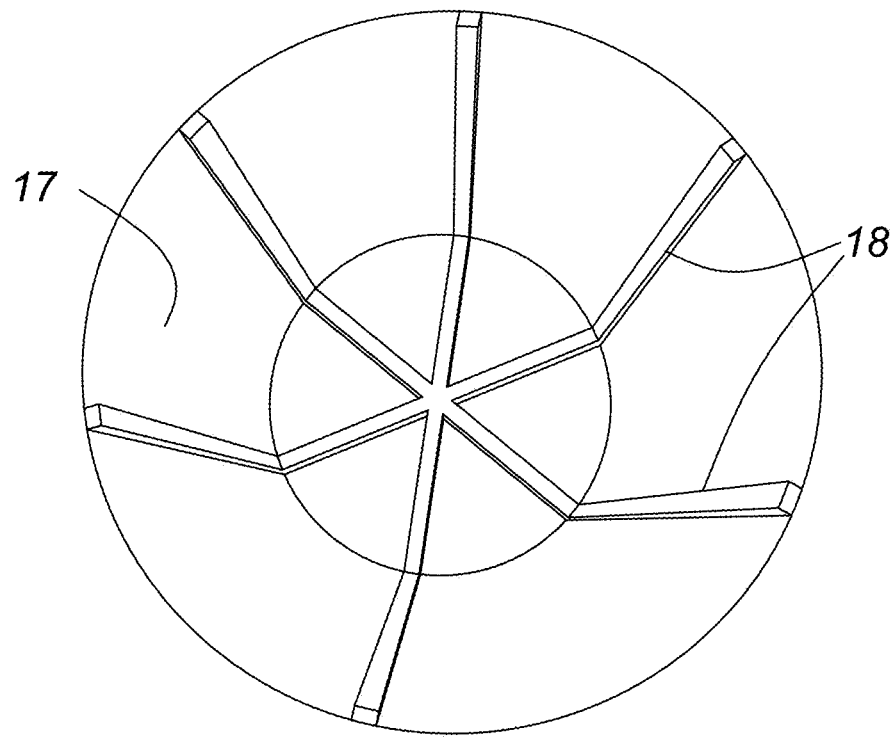
FIG. 9 illustrates a top perspective view of the internal walls of the container portion.
Figure 10:
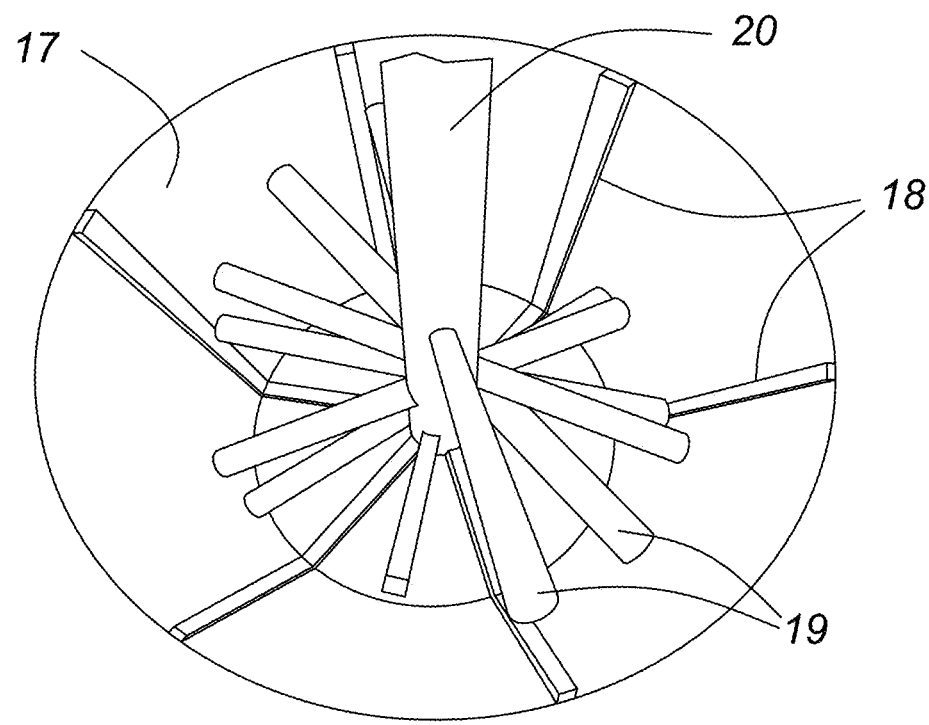
FIG. 10 illustrates a top perspective view of the container portion of the apparatus with the attrition mill mixer shaft arm inserted.

FIGS. 8 to 16 illustrate yet further embodiments of the attrition mill apparatus. For example, FIG. 8 illustrates an apparatus in which the attrition mixer unit 16 (comparable to 8 shown in FIG. 5) is removed axially from the container 17 (comparable to 2 in FIGS. 3 and 4). In FIG. 9 the elongate deviation bars or ribs 18 on the inside surface of the container (corresponding to 4 in FIG. 3) are visible on the inner walls of the container. In FIG. 10 the grinding arms 19 (also termed attrition bars) extending from the main shaft 20 of the attrition unit are visible in the container as the attrition unit is positioned co-axially into the container. As shown, the grinding bars are shown in an optionally, generally helical arrangement about the shaft.

Figure 11:
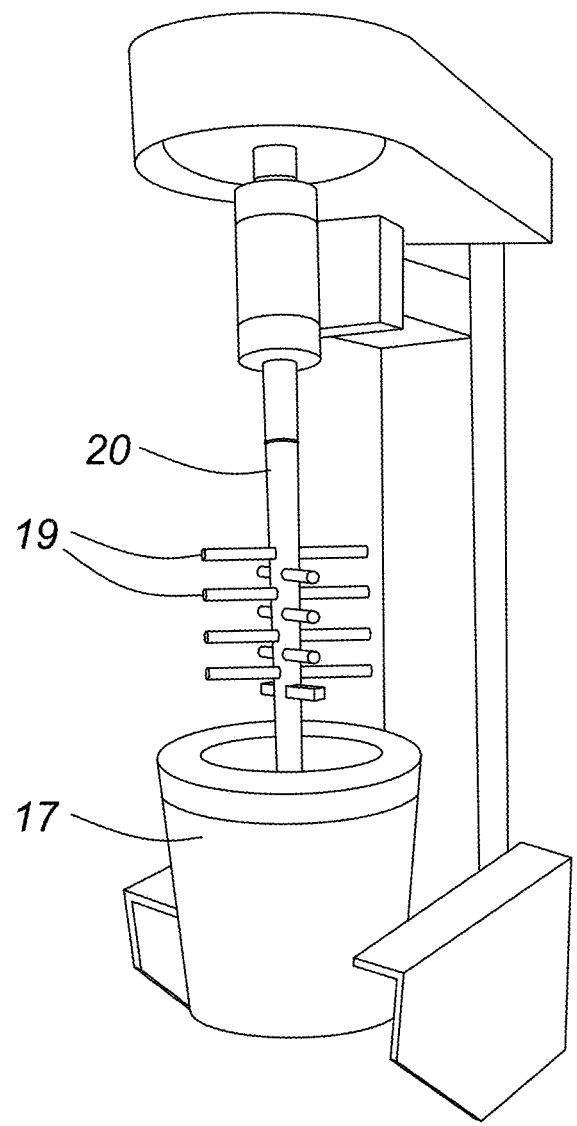
FIG. 11 illustrates a side perspective view of an example apparatus with the attrition mill mixer shaft arm removed axially from the container portion.
Figure 12:
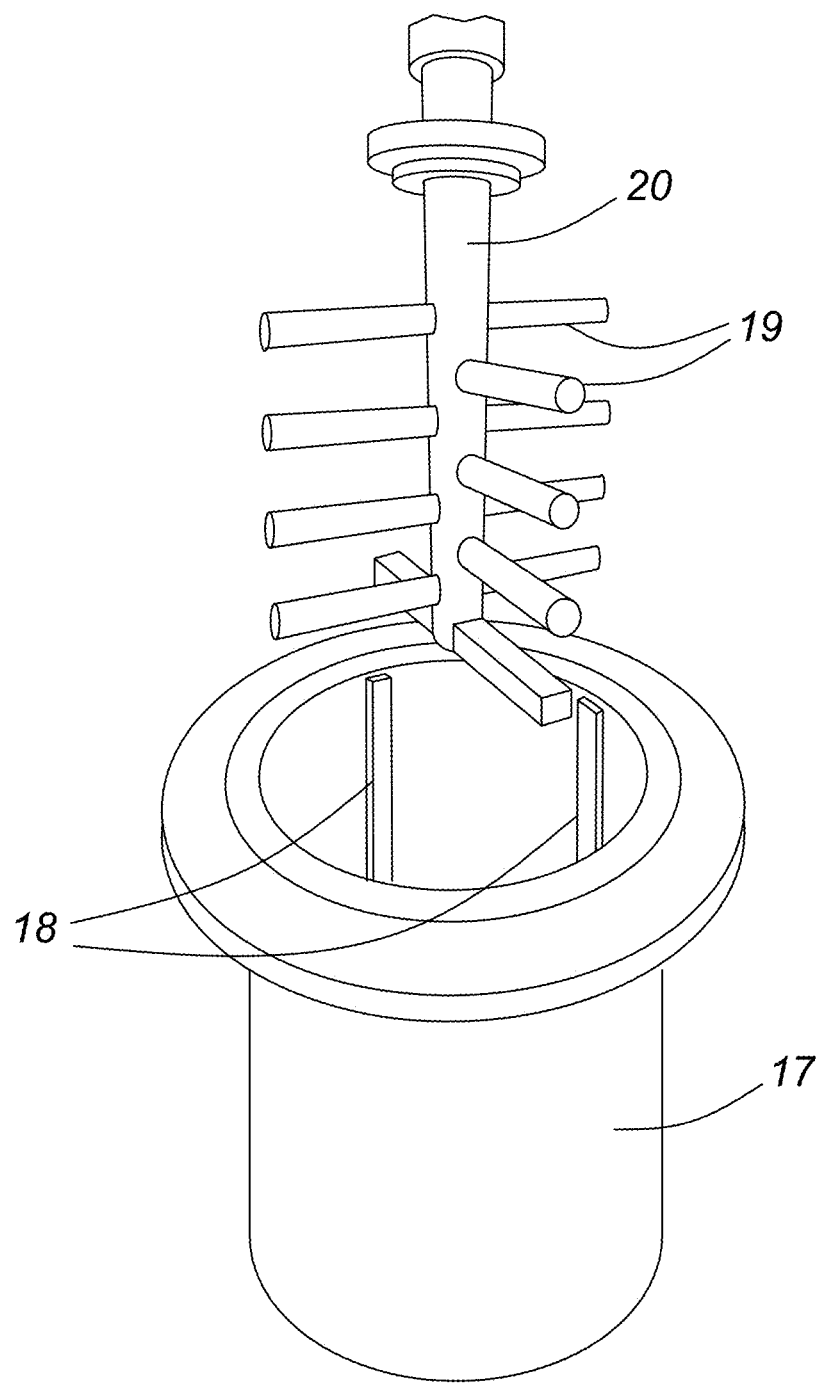
FIG. 12 illustrates a side perspective view of a close up of the attrition mill mixer shaft arm removed axially from the container portion.
Figure 13:
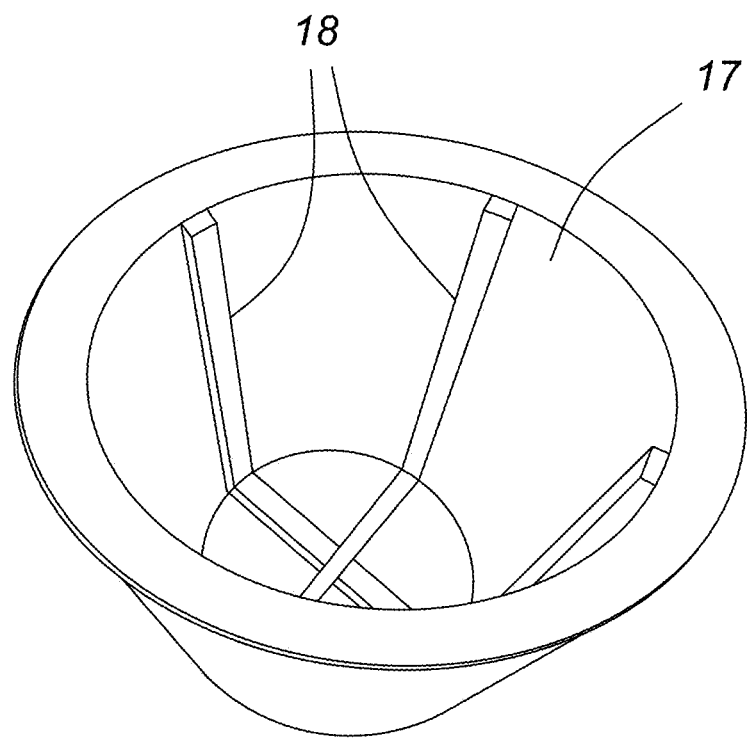
FIG. 13 illustrates a top perspective view of the inner walls of the container portion with the attrition mill mixer shaft arm removed.
Figure 14:
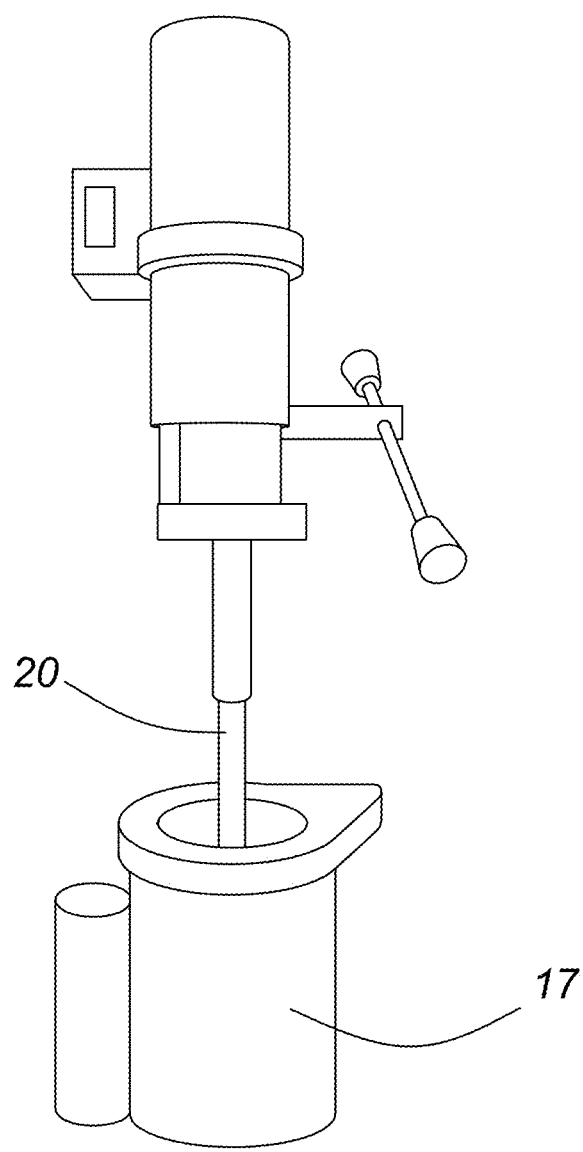
FIG. 14 illustrates a side perspective view of an example apparatus in operation.
Figure 15:
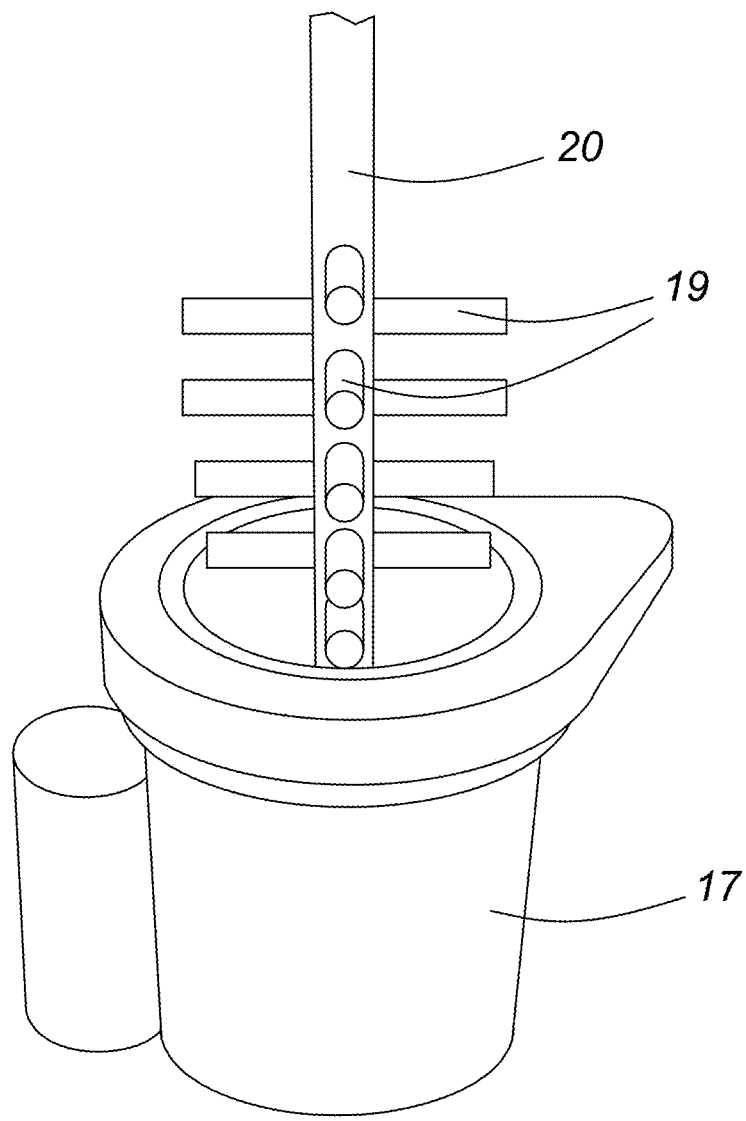
FIG. 15 illustrates a side perspective view of the apparatus with the attrition mill mixer shaft arm removed axially from the container portion.
Figure 16:
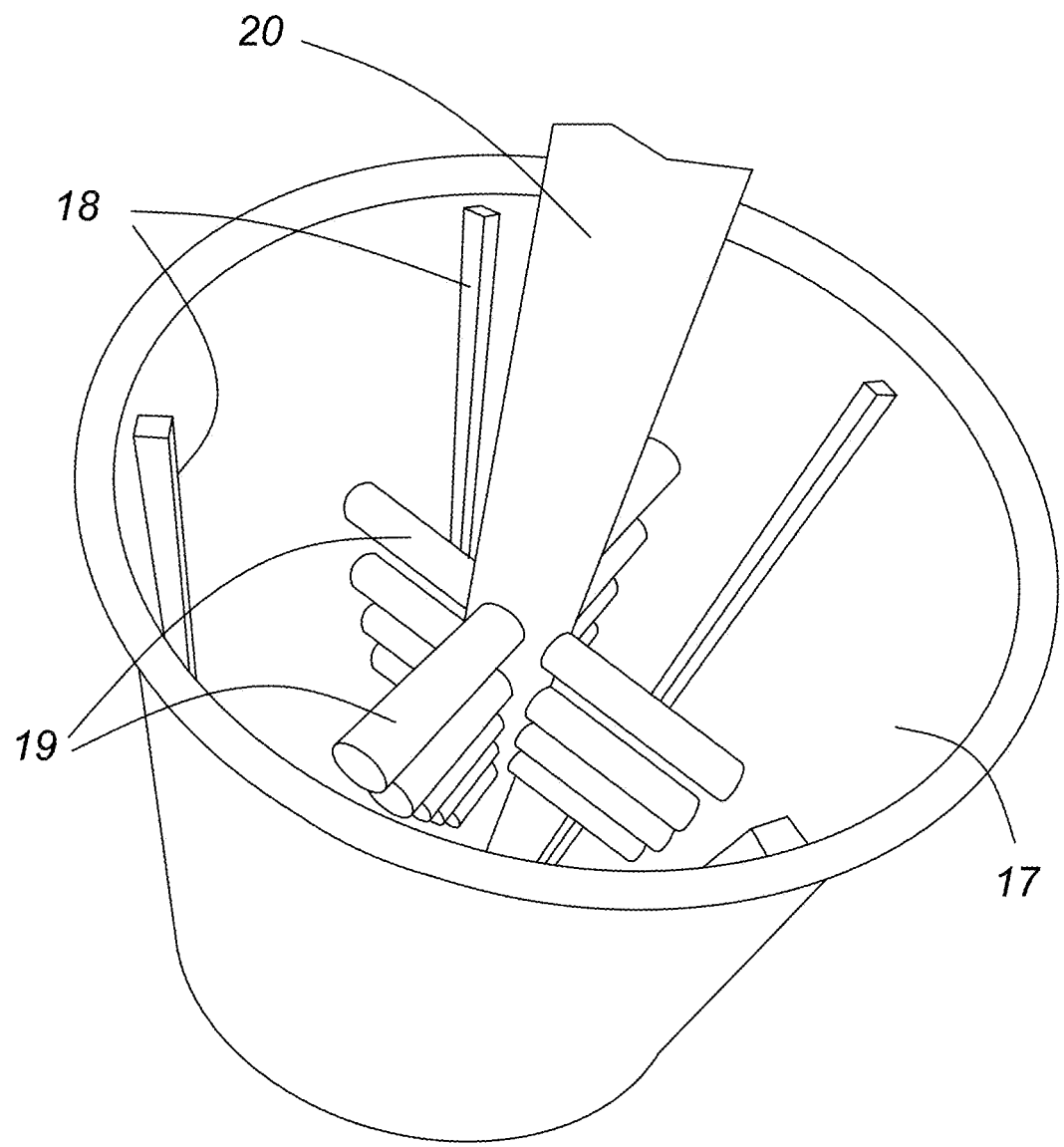
FIG. 16 illustrates a top perspective view of the inner walls of the container portion with the attrition mill mixer shaft arm inserted.

FIGS. 11 to 16 illustrate a similar apparatus, but with FIGS. 14 to 16 illustrating a smaller-scale apparatus compared to FIGS. 11 to 13. Nonetheless the features of the apparatus correspond substantially to those shown in FIGS. 8 to 10, with some exceptions. In FIG. 13 only four deviation bars or ribs 18 are shown on the inner walls of the container (in two opposing pairs). Furthermore, in FIGS. 11 and 12 the grinding arms (attrition arms) 17 of the attrition unit are shown in alternating 90 degree offset arrangement between adjacent grinding arms along the shaft. Such arrangement may be preferred in some circumstances depending upon the ore or waste to be processed.

Embodiments of the present invention provide a number of advantages. Advantages will be understood as per the above and the examples and experimental data obtained through the extensive studies presented below. In some but not all embodiments, the apparatuses herein disclosed may be suitable for a combining grinding and leaching of ore or waste in a single step in the apparatus, which may improve leaching and grinding efficiencies, may reduce process steps and energy consumption, may simplify equipment, and may reduce both of the CAPEX/OPEX.

EXAMPLES

While the present specification may be susceptible to various modifications and alternative forms, the embodiments will now be described by way of examples. However, it should again be understood that the specification is not intended to be limited to the particular examples disclosed herein. Indeed, the present specification includes all alternatives, modifications, and equivalents falling within the scope of the present specification.

General Methodology

The following describes the general methodology of examples of embodiments of the process and apparatus of the present invention.

Radioactive Wastes

The experiments described below were carried out with radioactive cemented wastes prepared at CanmetMINING. The procedure involves mixing a synthetic solution with either General Use (GU) or High Early Strength (HE) cements manufactured by Lafarge Canada Inc., in a manner that mimics the process carried out at CNL. The solid wastes batches were allowed to age and were subsequently removed from the pails with an air hammer. The whole pail content (~20 kg) was crushed in a laboratory jaw crusher (Retsch, model BB200) to the selected particle size and then split into representatives fractions using a large capacity (20 kg) rotary splitter (GENEQ, model SEO4OJ-001). Table 1 shows the experimental conditions used to prepare two radioactive wastes and their partial compositions.

TABLE 1

Main experimental parameters used to prepare solid wastes batches and partial composition

| Batch Code | Cement Type | Solution to Cement Ratio | Aging Time | Aging Temperature | Cs ppm | Hg ppm | U ppm |
|---|---|---|---|---|---|---|---|
| U28 | GU | 0.39 | 30 months | 60° C. | 8.5 | 1,973 | 1,150 |
| U29 | GU | 0.29 | 30 months | Ambient | 7.2 | 1,977 | 1,104 |

Ores

Experiments were conducted using six ores of rare earth elements (1 carbonatite, 4 peralkalines, 1 sedimentary). The ores were provided by six different mining companies and used as received. Table 2 shows the chemical compositions.

TABLE 2

Chemical composition of the six ores of rare earth elements

| Ore | Peralkaline A ore | Peralkaline B ore | Peralkaline C ore | Peralkaline D ore | Carbonatite ore | Sedimentary ore |
|---|---|---|---|---|---|---|
| Th (ppm) | 53 | 313.4 | 936.9 | 379.3 | 155.3 | 285.8 |
| U (ppm) | 17.6 | 31.6 | 151.3 | 22.7 | 18 | 264.2 |
| Y (ppm) | 1507 | 949.5 | 3854 | 1213 | 55 | 50.1 |
| La (ppm) | 2517 | 433.7 | 1579 | 2032 | 3662 | 340.4 |
| Ce (ppm) | 5752 | 1086 | 3526 | 4031 | 7427 | 623.4 |
| Pr (ppm) | 672 | 136.1 | 368.1 | 448.1 | 769.4 | 63.9 |
| Nd (ppm) | 2603 | 531.4 | 1239 | 1586 | 2574 | 207 |
| Sm (ppm) | 554.1 | 117.1 | 319.5 | 276.1 | 244 | 37.4 |
| Eu (ppm) | 67.5 | 14.6 | 20.7 | 14 | 43.2 | 2.3 |
| Gd (ppm) | 535.8 | 117.4 | 358.3 | 239.6 | 115 | 26 |
| Tb (ppm) | 83.2 | 21.5 | 81.3 | 34.8 | 7.3 | 2.9 |
| Dy (ppm) | 454.3 | 146.9 | 609.4 | 208 | 19.2 | 12.5 |
| Ho (ppm) | 75 | 32.6 | 139.4 | 39.7 | 2.4 | 1.9 |
| Er (ppm) | 177 | 106.4 | 452.4 | 112 | 6.9 | 4.5 |
| Tm (ppm) | 19.3 | 16.1 | 67.1 | 15.3 | 0.4 | 0.6 |
| Yb (ppm) | 101.6 | 109.5 | 413.4 | 92.9 | 2.8 | 3.9 |
| Lu (ppm) | 10.5 | 14.1 | 51.1 | 11.2 | 0.5 | 0.5 |

Grinding and Leaching Experiments

Three attrition cells (1.2 L, 12 L and 120 L) were designed to conduct grinding and leaching experiments on the different cemented wastes and the six different ores of rare earth elements. Testing were performed using wastes and ores at different pulp density and using different particle size materials. Inorganic base and leaching salt were added to the ore or waste at the beginning of the attrition tests. The inorganic acid was added using a peristaltic pump during the experiments at a fixed flow rate. Temperature and pH were recorded during the experiments.

Analytical

Liquid samples were analyzed by ICP-MS (Thermo-Fisher Scientific, X-Series II), after appropriate dilution with HCl to stabilize the Hg(II). Solid samples acid digestion was done by microwave, analyzed by ICP-MS and compared with certified reference materials of REE ores.

Figure 17:
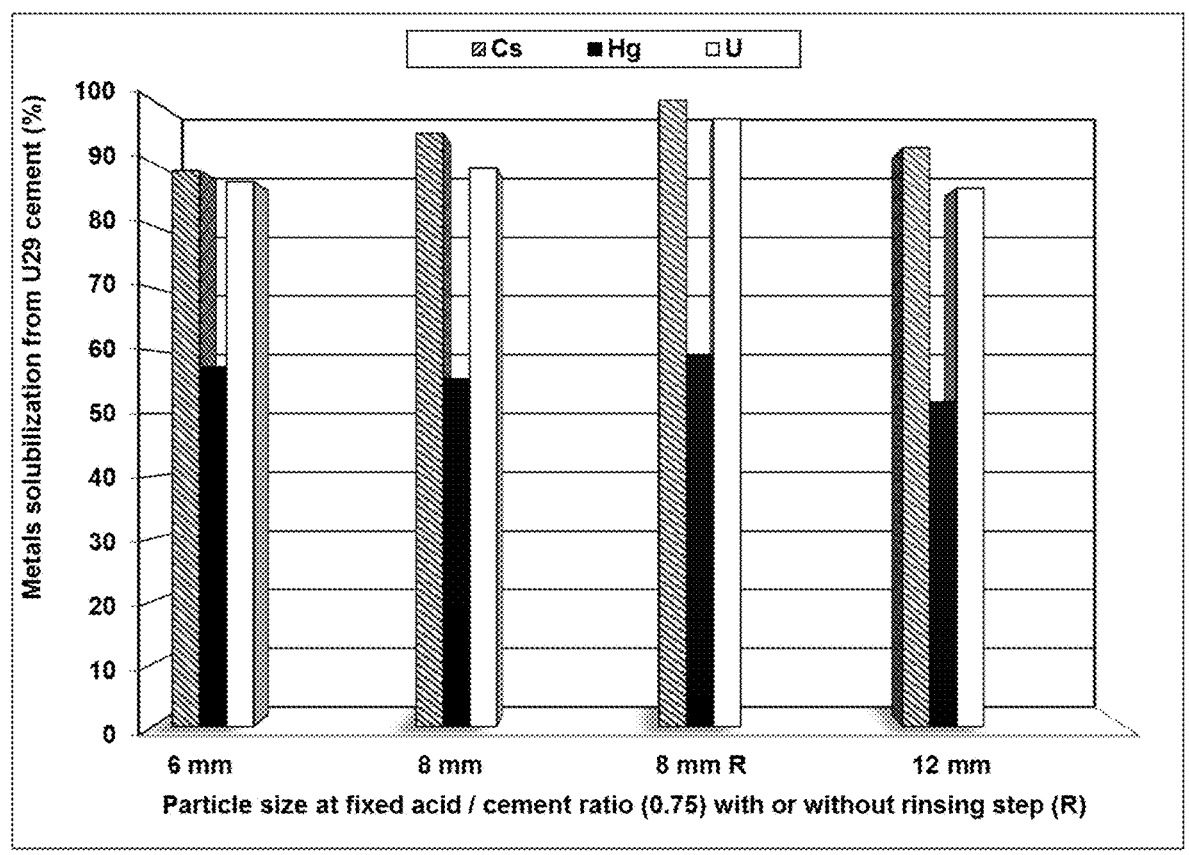
FIG. 17 is a graph to show solubilization of U29 radioactive cemented waste in an apparatus by combining grinding and leaching with sulfuric acid at different particle sizes and with or without rinsing (pulp density fixed at 20%, acid/cement ratio fixed at 1.75).

Example 1: Grinding and Leaching of Radioactive Wastes in a Modified Attrition Mill Various radioactive cemented wastes were cured at 60° C. and/or aged during 30 months were subjected to grinding and leaching in the modified attrition mill. These radioactive cemented wastes were U28 (30 months at 60° C.), U29 (30 months at ambient temperature). Initial concentration of Cs, Hg, and U are given in Table 1. FIG. 17 is a diagram showing the solubilization of the U29 radioactive cemented waste in the modified attrition mill by combining grinding and leaching with sulfuric acid at different particle size and with or without rinsing (pulp density fixed at 20%, acid/cement ratio fixed at 1.75). The U29 radioactive cemented waste was crushed at different particle size (6 mm, 8 mm, 12 mm). Samples of 100 g were mixed with 500 mL of distilled water to obtain pulp density of 20%. Then pure sulfuric acid was added using a peristaltic pump (6 mL/min flowrate) to obtain a fixed acid/cement ratio of 0.75 (about 1.5 M). The acid/cement ratio is a key parameter as cement dissolution and U solubilization are pH dependent. The acid consumption depends on the particle size of the cement after grinding. The pH needs to be comprised between 1.5 and 2 to enhance U solubilization. Samples were subjected to combine grinding and leaching in the small attrition cell (1.2 L) as show in FIGS. 14 to 16 during 1 h. The processing of radioactive wastes at different particle size in the modified attrition mill allows an efficient solubilization of Cs and U with solubilization yields of 90-100% and 88-98% respectively. The addition of a rinsing step (8 mm R) increases significantly the solubilization yields of Cs, Hg, and U.

The Hg solubilization yields are between 50% and 60%, but Hg solubilization will be enhanced using a leaching salt. This is due to the mineralogy of the cemented waste. Uranium phases are found mainly as long layers (400 μm) and some small grains. Mercury phases are found as grains below 20 μm and the small grains that tend to agglomerate with longer aging times and higher aging temperatures. Moreover, the proportion of metallic mercury and mercury sulfide appears to increase with aging times and aging temperatures.

Example 2: Influence of Pulp Density and Addition of a Leaching Salt

Figure 18:
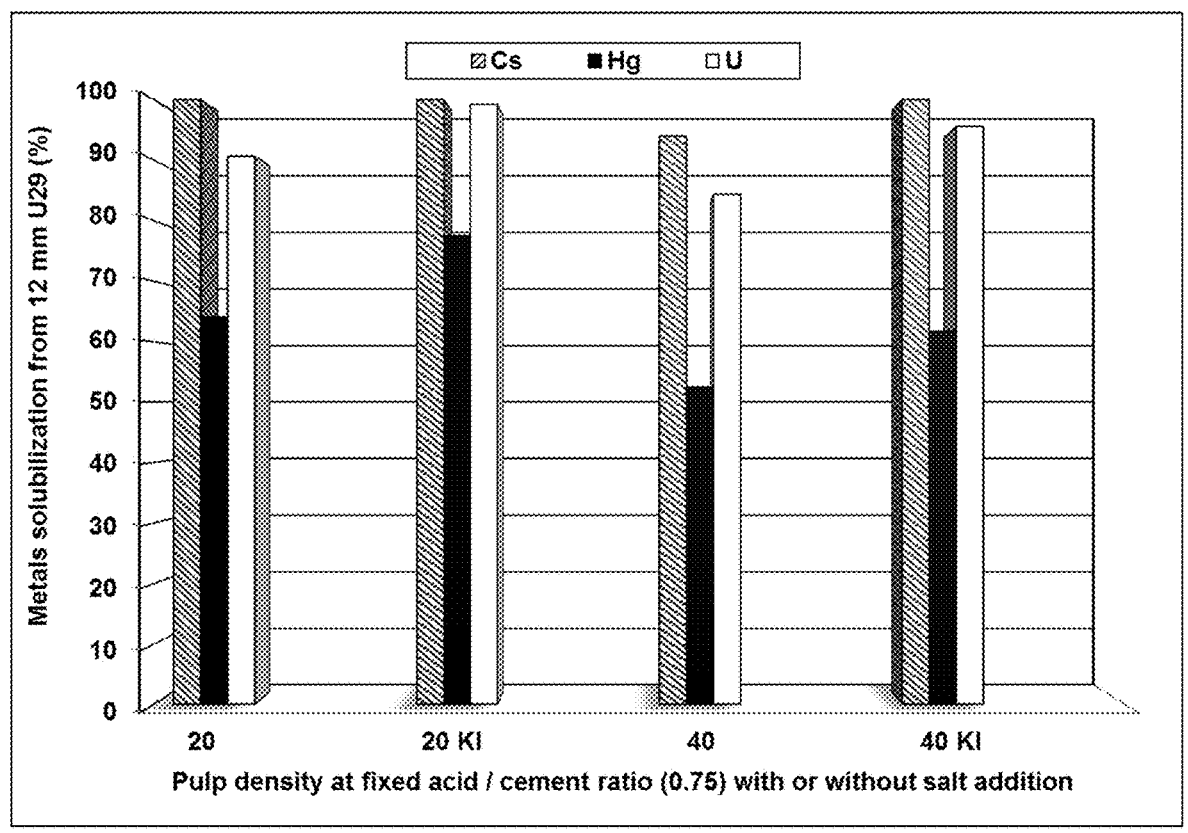
FIG. 18 is a graph to show solubilization of U29 radioactive cemented waste in an apparatus by combining grinding and leaching with sulfuric acid at different pulp density and with or without salt (particle size fixed at 12 mm, acid/cement ratio fixed at 1.75).

The U29 radioactive cemented waste crushed at 12 mm was used to investigate the influence of pulp density and the addition of the leaching salt. Samples of 100 g and 200 g were mixed with 500 mL of distilled water to obtain pulp density of 20% and 40% respectively. Potassium iodide was added as leaching salt to obtain a concentration of 0.06M to enhance Hg solubilization. Then pure sulfuric acid was added using a peristaltic pump (6 mL/min flowrate) to obtain a fixed acid/cement ratio of 0.75 (about 1.5 M for 20% pulp density and 3M for 40% pulp density). The acid consumption depends on the particle size of the cement after grinding. The pH needs to be comprised between 1.5 and 2 to enhance U solubilization. Samples were subjected to combine grinding and leaching in the small attrition cell (1.2 L) as shown in FIGS. 14 to 16. FIG. 18 is a diagram showing the solubilization of the U29 radioactive cemented waste in the modified attrition mill by combining grinding and leaching with sulfuric acid at different pulp density and with or without salt (particle size fixed at 12 mm, acid/cement ratio fixed at 1.75). The processing of radioactive wastes at different pulp density in the modified attrition mill allows an efficient solubilization of Cs and U with solubilization yields above 95% for Cs and 85% for U for pulp density of 20% or 40%, respectively. The leaching salt increase the Hg solubilization from 65% to 79% at 20% pulp density and from 52% to 63% at 40% pulp density.

Sulfuric acid and potassium iodide improve the solubilization of Hg by oxidation of all the mercury species and form mercury tetraiodide complex ($HgI_4^{2-}$, $Kf=2.10^{30}$). Sodium chloride formed mercury complex ($HgCl_4^{2-}$, $Kf=5.10^{15}$) when Hg is present as mercury oxide HgO or metallic mercury $Hg^0$ in 30 months aged wastes but not with mercury sulfide HgS (pK=52) formed in 60° C. cured wastes. In order to oxidize $Hg^0$, as well as HgS, tests were performed using iodide halogen salt as strong oxidant to form Hg complex ($HgI_4^{2-}$, $Kf=2.10^{30}$).

Figure 19:
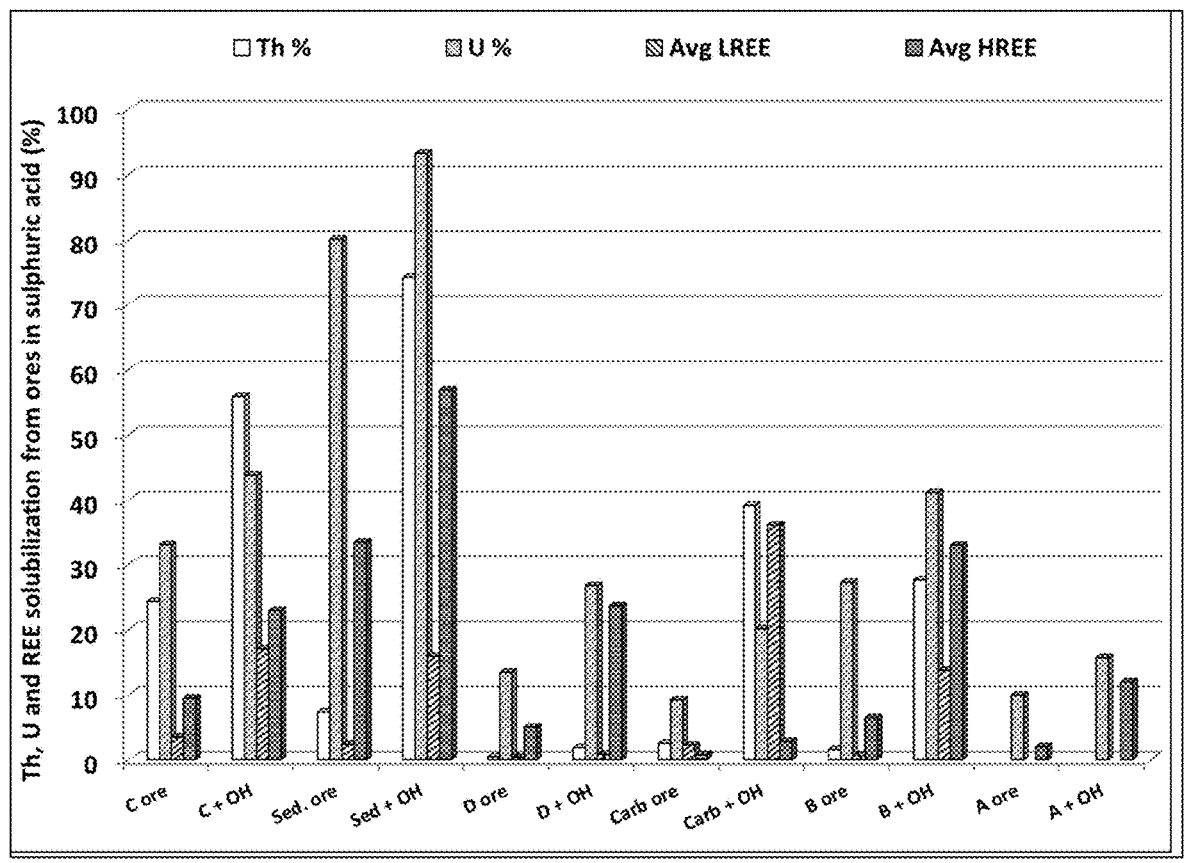
FIG. 19 is a graph to show solubilization of U28 radioactive cemented waste in an apparatus by combining grinding and leaching with sulfuric acid at different salt concentrations (particle size fixed at 8 mm, acid/cement ratio fixed at 1.5).

Example 3: Grinding and Leaching of Radioactive Wastes in a Large Modified Attrition Mill The U28 radioactive cemented waste (aged 30 months at 60° C.) crushed at 8 mm was used to investigate the influence of the addition of the leaching salt. Samples of 800 g were mixed with 3674 mL of distilled water to obtain pulp density of 20%. Potassium iodide (masses of 40, 80, 120, and 160 g) was added as leaching salt to obtain a concentration of 10 to 40 g/L to enhance Hg solubilization. Then pure sulfuric acid was added using a peristaltic pump (33 mL/min flowrate) to obtain a fixed acid/cement ratio of 0.75 (about 1.5 M for 20% pulp density). Samples were subjected to combine grinding and leaching in the large attrition cell (12 L) as show in FIGS. 11 to 13. FIG. 19 is a graph to show solubilization of U28 radioactive cemented waste in an apparatus by combining grinding and leaching with sulfuric acid at different salt concentration (particle size fixed at 8 mm, acid/cement ratio fixed at 1.5).

The processing of radioactive wastes at different acid concentration in the large modified attrition mill allows an efficient solubilization with solubilization yields above 99% for Cs and U at potassium iodide concentration of 20 and 30 g/L, respectively. Best Hg solubilization was obtained at potassium iodide concentration of 30 g/L. Sulfuric acid and potassium iodide improve the solubilization from wastes aged 30 months at 60° C.

Figure 20:
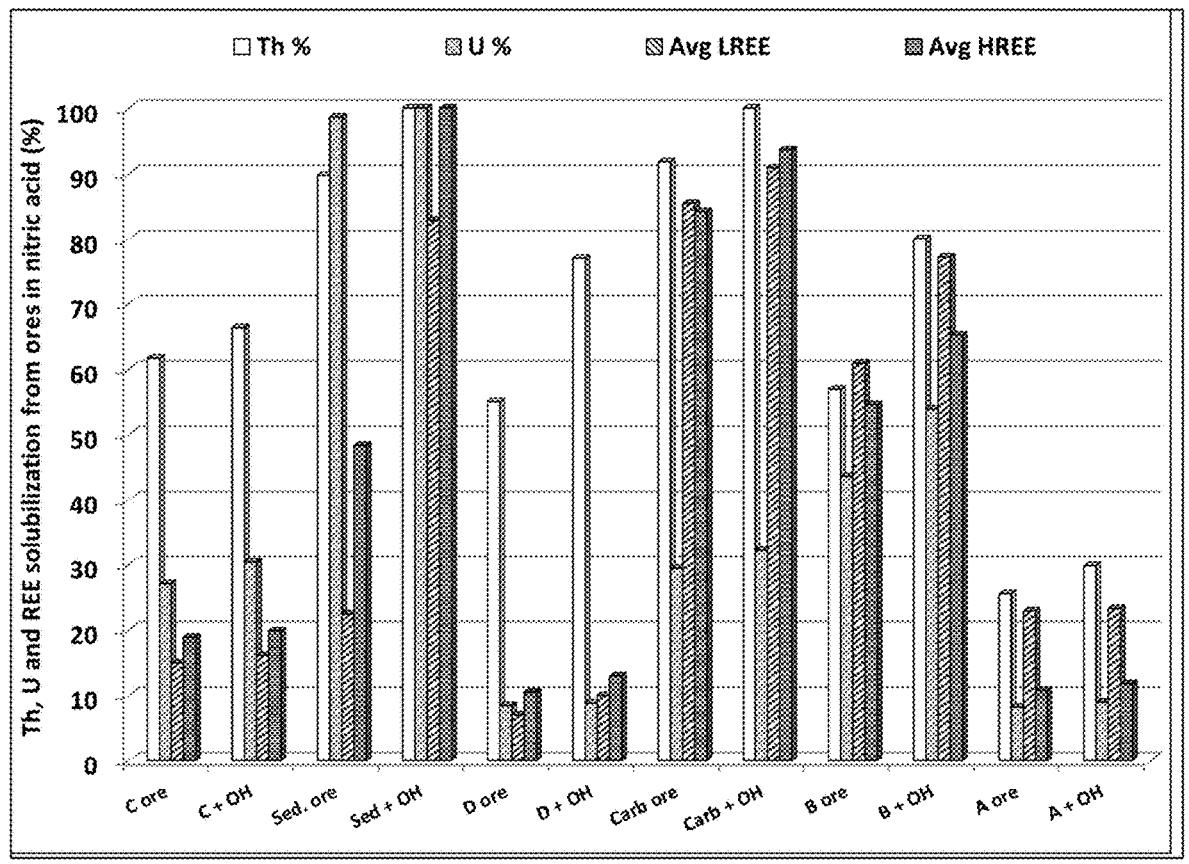
FIG. 20 is a graph to show solubilization of Th, U, and REE from the 6 ores in a modified attrition mill by combining grinding and leaching with sulfuric acid with or without NaOH addition performed at room temperature during 1 h (pulp density fixed at 20%, acid concentration fixed at 7.5 M).

Example 4: Grinding and Leaching of REE Ores in a Modified Attrition Mill Using Sulfuric Acid Experiments on ores were conducted using six ores of rare earth (1 carbonatite, 4 peralkalines, 1 sedimentary). The coarse ores (2-3 mm) were provided by six different mining companies and used as received. Theses ores were subjected to grinding and leaching in the modified attrition mill. A 100 g sample of ore was mixed with 250 mL of distilled water to obtain a 40% pulp density. Then pure sulfuric was added using a peristaltic pump (6 mL/min flowrate) to obtain a fixed acid concentration of about 7.5 M and a final pulp density of about 20%. Samples were subjected to combined grinding and leaching in the small attrition cell (1.2 L) as show in FIGS. 14 to 16 during 1 h. Initial concentration of Th, U and rare earth elements (REE) in each ores are given in Table 2. NaOH additions were performed to enhance metals solubilization. For this purpose, the ore was grind with 25 g of NaOH pellets during 15 minutes at 40% pulp density before the addition of acid. FIG. 20 is a diagram showing the solubilization of Th, U, and REE from the 6 ores in the modified attrition mill by combining grinding and leaching with sulfuric acid with or without NaOH addition performed at room temperature during 1 h (pulp density fixed at 20%, acid concentration fixed at 7.5M). For the C ore, solubilization yields with and without NaOH reached 24-55% for Th, 32-43% for U, 3-17% for light rare earth and 9-23% for heavy rare earth. For the Sed. ore, solubilization yields with and without NaOH reached 46-87% for Th, 80-93% for U, 7-31% for light rare earth and 33-57% for heavy rare earth. For the D ore, solubilization yields with and without NaOH reached 7-74% for Th, 13-26% for U, 2-16% for light rare earth and 5-24% for heavy rare earth. For the Carb. ore, solubilization yields with and without NaOH reached 0-2% for Th, 9-20% for U, 0-1% for light rare earth and 0-3% for heavy rare earth. For the B ore, solubilization yields with and without NaOH reached 2-39% for Th, 27-41% for U, 2-36% for light rare earth and 6-33% for heavy rare earth. For the A ore, solubilization yields with and without NaOH reached 1-27% for Th, 10-16% for U, 0-14% for light rare earth and 2-12% for heavy rare earth.

The grinding and leaching in the modified attrition mill using sulfuric acid is efficient for most of the ores but the addition of NaOH do not increase the solubilization of Th, U, and REE.

Figure 21:
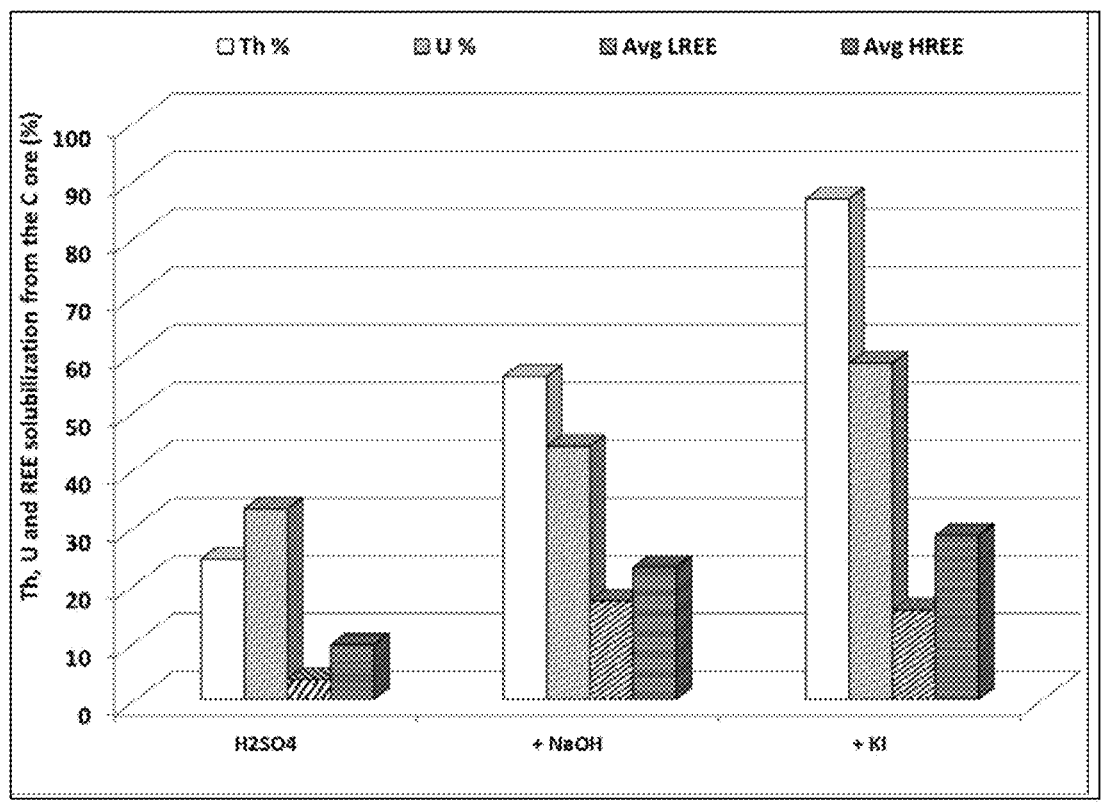
FIG. 21 is graph to show solubilization of Th, U, and REE from 6 ores in a modified attrition mill by combining grinding and leaching with nitric acid with or without NaOH addition performed at room temperature for 1 h (pulp density fixed at 20%, acid concentration fixed at 7.5 M).
Figure 21:
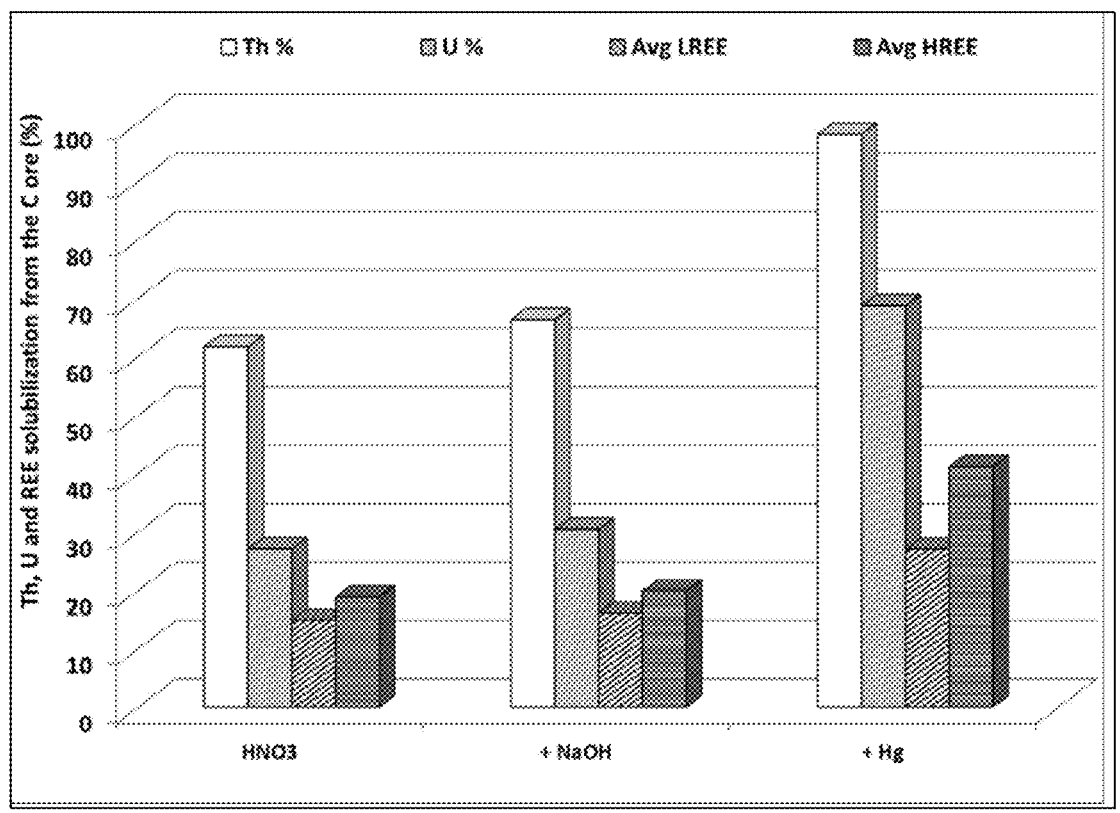

Example 5: Grinding and Leaching of REE Ores in a Modified Attrition Mill Using Nitric Acid Experiments on ores were conducted using six ores of rare earth (1 carbonatite, 4 peralkalines, 1 sedimentary). Theses ores were subjected to grinding and leaching in the modified attrition mill. A 100 g sample of ore was mixed with 250 mL of distilled water to obtain a 40% pulp density. Then pure nitric acid was added using a peristaltic pump (6 mL/min flowrate) to obtain a fixed acid concentration of about 7.5 M and a final pulp density of about 20%. Samples were subjected to combine grinding and leaching in the small attrition cell (1.2 L) as show in FIGS. 14 to 16 during 1 h. Initial concentration of Th, U and rare earth elements (REE) in each ores are given in Table 2. NaOH additions were performed to enhance metals solubilization. For this purpose, the ore was ground with 25 g of NaOH pellets during 15 minutes at 40% pulp density before the addition of acid. FIG. 21 is a diagram showing the solubilization of Th, U, and REE from the 6 ores in the modified attrition mill by combining grinding and leaching with nitric acid with or without NaOH addition performed at room temperature during 1 h (pulp density fixed at 20%, acid concentration fixed at 7.5M). For the C ore, solubilization yields with and without NaOH reached 61-66% for Th, 27-30% for U, 15-16% for light rare earth and 19-20% for heavy rare earth. For the Sed. ore, solubilization yields with and without NaOH reached 89-99% for Th, 98-99% for U, 22-83% for light rare earth and 48-99% for heavy rare earth. For the D ore, solubilization yields with and without NaOH reached 55-77% for Th, 8-9% for U, 7-10% for light rare earth and 10-13% for heavy rare earth. For the Carb. ore, solubilization yields with and without NaOH reached 91-99% for Th, 29-32% for U, 85-91% for light rare earth and 84-94% for heavy rare earth. For the B ore, solubilization yields with and without NaOH reached 56-80% for Th, 43-54% for U, 61-77% for light rare earth and 54-65% for heavy rare earth. For the A ore, solubilization yields with and without NaOH reached 25-30% for Th, 8-9% for U, 22-23% for light rare earth and 11-12% for heavy rare earth.

The grinding and leaching in the modified attrition mill using nitric acid is very efficient and the addition of NaOH increases significantly the solubilization of Th, U, and REE for most of the ores. The grinding and leaching of ores in the modified attrition mill using nitric acid is the most efficient.

Example 6: Grinding and Leaching of REE Ores with a Leaching Salt

Experiments of grinding and leaching of ore in the modified attrition mill using a leaching salt were done using the C ore of rare earth. A 100 g sample of ore was mixed with 250 mL of distilled water to obtain a 40% pulp density. Then pure sulfuric or nitric acid was added using a peristaltic pump (6 mL/min flowrate) to obtain a fixed acid concentration of about 7.5 M and a final pulp density of about 20%. Samples were subjected to combine grinding and leaching in the small attrition cell (1.2 L) as show in FIGS. 14 to 16 during 1 h. Initial concentration of Th, U and rare earth elements (REE) in the C ore is given in Table 2. NaOH additions were performed to enhance metals solubilization. For this purpose, the ore was ground with 25 g of NaOH pellets during 15 minutes at 40% pulp density before the addition of acid. Leaching salts were added to enhance metals dissolution (Reynier et al., 2015; Mellor, 1930; Kitts et Perona, 1957).

Figure 22:
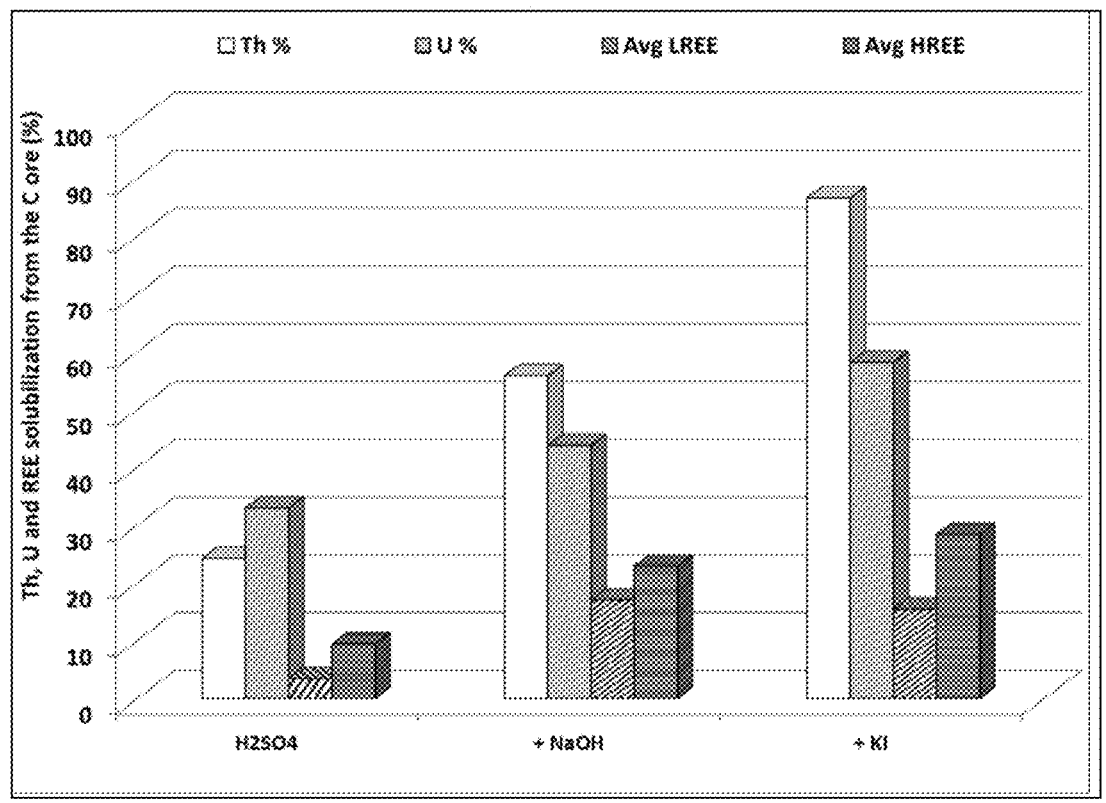
FIG. 22 is a graph to show solubilization of Th, U, and REE from the C ore in a modified attrition mill by combining grinding and leaching with sulfuric acid with or without NaOH addition and salt addition (KI or $Hg(NO_3)_2$) performed at 20° C. for 1 h (pulp density fixed at 20%, acid concentration fixed at 7.5 M, salt concentration fixed at 0.06 M for KI and 0.03 M for $Hg(NO_3)_2$).
Figure 23:
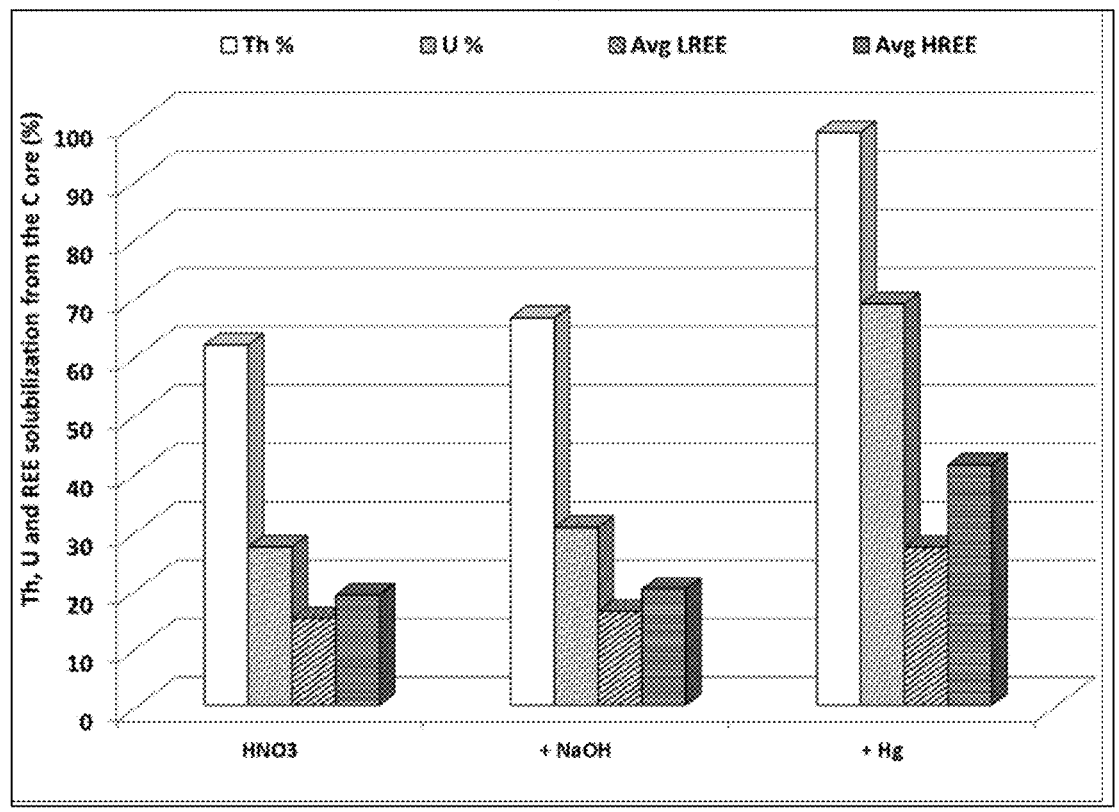
FIG. 23 is a graph to show solubilization of Th, U, and REE from the C ore in a modified attrition mill by combining grinding and leaching with nitric acid with or without NaOH addition and salt addition (KI or $Hg(NO_3)_2$) performed at 20° C. for 1 h (pulp density fixed at 20%, acid concentration fixed at 7.5 M, salt concentration fixed at 0.06 M for KI and 0.03 M for $Hg(NO_3)_2$).

FIGS. 22 and 23 are diagrams showing the solubilization of Th, U, and REE from the C ore in the modified attrition mill by combining grinding and leaching with a) sulfuric acid and b) nitric acid with or without NaOH addition and salt addition (KI or $Hg(NO_3)_2$) performed at room temperature during 1 h (pulp density fixed at 20%, acid concentration fixed at 7.5 M, salt concentration fixed at 0.06 M for KI and 0.03 M for $Hg(NO_3)_2$). In FIG. 22, the combined grinding and leaching of the C ore in sulfuric acid is improved significantly by the addition of potassium iodide as a leaching salt. Solubilization yields with KI reached 86.6±5.3% for Th, 58.1±9.4% for U, 15.4±3.9% for light rare earth and 28.3±4.9% for heavy rare earth.

In FIG. 23, the combined grinding and leaching of the C ore in nitric acid is improved significantly by the addition of mercury nitrate as a leaching salt. Solubilization yields with $Hg(NO_3)_2$ reached 98.0±3.2% for Th, 68.7±11.0% for U, 27.0±5.9% for light rare earth and 41.1±5.6% for heavy rare earth.

The grinding and leaching of ores in the modified attrition mill using nitric acid is the most efficient. The addition of a leaching salt (potassium iodide or mercury nitrate or a combination thereof) increases significantly the solubilization of Th, U, and REE from the C ore.

Example 7: Grinding and Leaching of REE Ores in a Large Modified Attrition Mill

Figure 24:
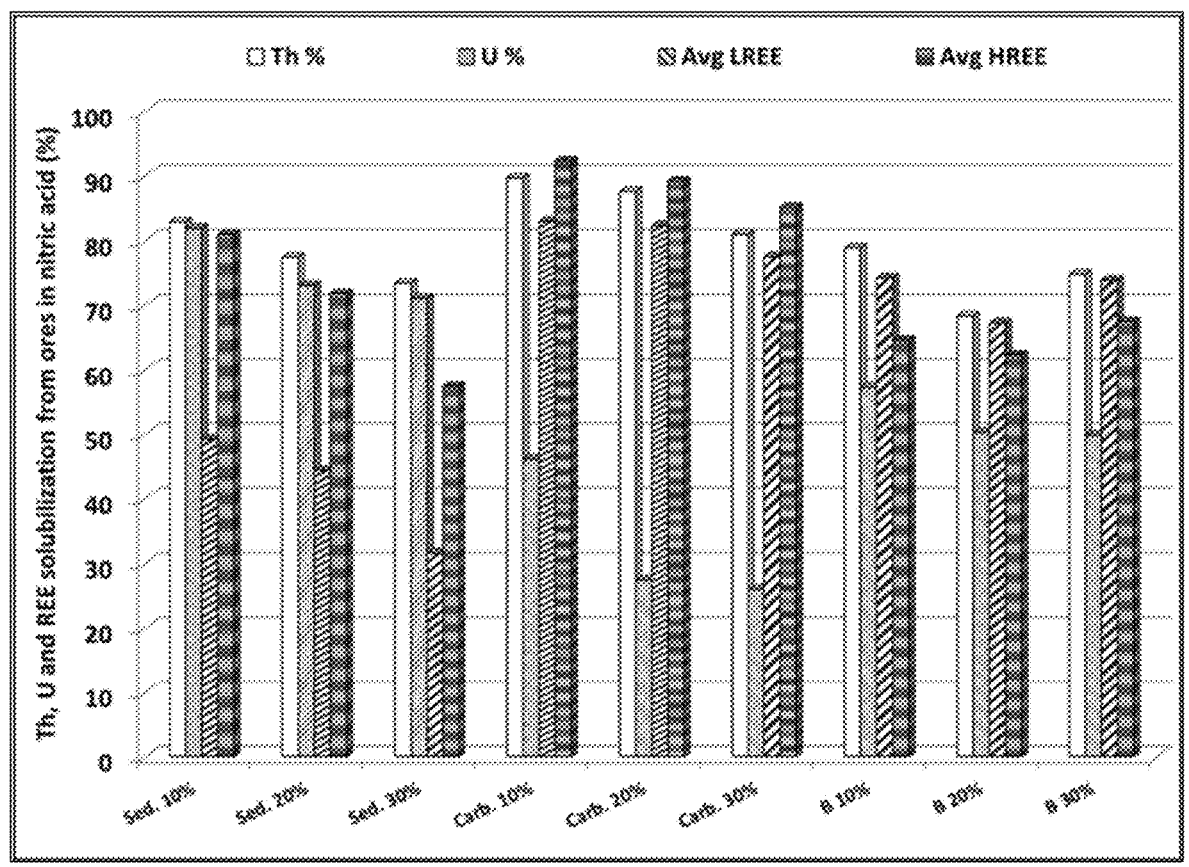
FIG. 24 is graph to show solubilization of Th, U and REE from 3 ores in a modified attrition mill by combining grinding and leaching with nitric acid performed at 75° C. for 2 h at different pulp density and an acid concentration fixed at 30%).

Experiments on ores were conducted using six ores of rare earth (1 carbonatite, 4 peralkalines, 1 sedimentary). The coarse ores (2-3 mm) were provided by six different mining companies and used as received. Theses ores were subjected to grinding and leaching in the large modified attrition mill. A 500, 1000 or 1500 g sample of ore was mixed with 3350 mL of distilled water. Then pure acid was added using a peristaltic pump (50 mL/min flowrate) to obtain a fixed acid concentration of about 30% and a final pulp density of about 10, 20, or 30%. Samples were subjected to combined grinding and leaching in the large attrition cell (12 L) as show in FIGS. 11 to 13 during 2 h. FIG. 24 is graph to show solubilization of Th, U, and REE from 3 of the ores in a modified attrition mill by combining grinding and leaching with nitric acid performed at 75° C. for 2 h at different pulp density and an acid concentration fixed at 30%). Solubilization of Th, U, LREE, and HREE remains stable when processing the REE ores in the large modified apparatus at different pulp density. The pulp density may be increased to grind and leach more materials at the same time. Results obtained for Sed. ore, Carb. ore, and Peralkaline B ore are very promising. The solubilization efficiencies were not affected when using a large modified grinding apparatus at different pulp density.

Figure 25:
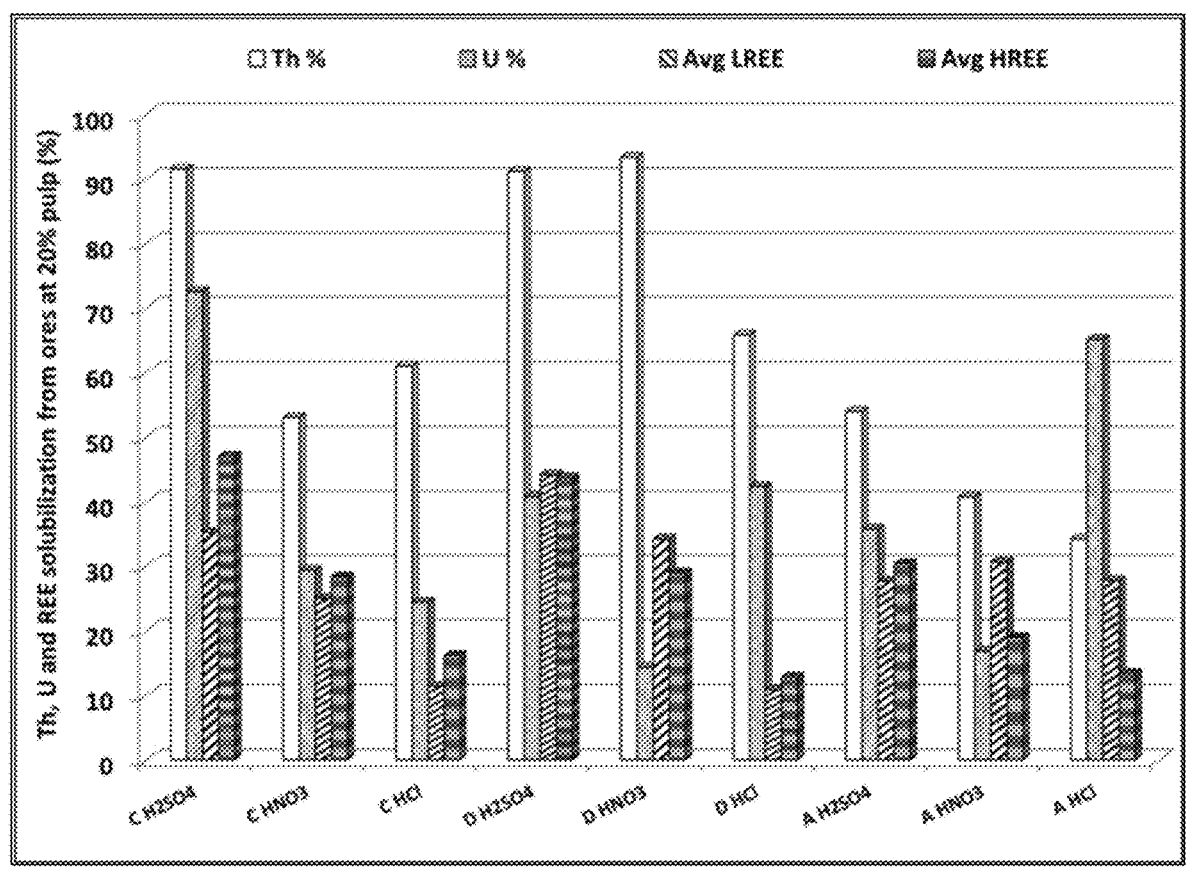
FIG. 25 is graph to show solubilization of Th, U, and REE from 3 ores in a modified attrition mill by combining grinding and leaching with different acid (sulphuric, nitric, hydrochloric) performed at 75° C. for 2 h with acid concentration fixed at 30%.

FIG. 25 is graph to show solubilization of Th, U, and REE from 3 of the ores in a modified attrition mill by combining grinding and leaching with different acid (sulfuric, nitric, hydrochloric) performed at 75° C. for 2 h with acid concentration fixed at 30%. These experiments were performed at 20% pulp density (by using 1000 g of REE ore). For the peralkaline ores A, C, and D, solubilization yields are lower than for the 3 others ores due to their respective mineralogy but the process using the large modified apparatus was still efficient. The combined grinding and leaching using sulfuric acid achieved better results than hydrochloric and nitric acids for these ores. The addition of a leaching salt (potassium iodide or mercury nitrate or mercury tetraiodide) is expected to increase solubilization of Th, U, and REE from these ores.

REFERENCES

Foust D. F. 1993. Extraction of mercury and mercury compounds from contaminated material and solutions. U.S. Pat. No. 5,226,545.
Habashi F. 2013. Extractive metallurgy of rare earths. Canadian Metallurgical Quaterly, 52 (3), 224-233.
Klasson T. K., Koran L. J. 1997. Removal of mercury from solids using the potassium iodide/iodine leaching process. Oak Ridge National Laboratory, ORNL/TM-13137, Oak Ridge Tenn.
Low-Level Radioactive Waste Management Office 2012. Inventory of Radioactive Waste in Canada. LLRWMO-01613-041-10003, CC3-1/2012, Ottawa, ON.
Reynier N., Lastra R., Laviolette C., Bouzoubaa N. Chapman M. 2015. Uranium, cesium and mercury leaching from cemented radioactive wastes in sulphuric and iodide media. Minerals, 5(4), 744-757.
Kitts F. G., Perona J. J. 1957. A Preliminary Study, of Pre-Solvent Extraction Treatment of Stainless Steel-Uranium Fuels with Dilute Aqua Regia; Oak Ridge National Laboratory, CF-57-6-125, Oak Ridge, Tenn., USA.
Mellor, J. W. 1930. The Chemical Properties of Sulfuric Acid, in a Comprehensive Treatise on Inorganic and Theoretical Chemistry, LVII, Vol. 31, pp 432-444. Longmans: U K.
Reynier N., Lastra R., Laviolette C., Fiset J.-F., Bouzoubaa N., Chapman M. 2016. Comparison of uranium recovery by ion exchange from sulfuric acid liquor in iodide and chloride media, Solvent Extraction and Ion Exchange, 34(2), 188-200.
Merritt R. C., 1971. The extractive metallurgy of uranium. Colorado School of Mines Research Institute. Johnson Publishing Company, Boulder, Co., U.S.A.
Queneau P. B. and Berthold C. E., 1986. "Silica in hydrometallurgy: An overview". Can. Met. Q., 25(3), 201-209.
Wilkinson W. D., 1962. "Uranium Metallurgy, Volume I (Uranium Process Metallurgy)". John Wiley and Sons.
Zhu Z., Pranolo Y., and Cheng C. Y. 2015. Separation of uranium and thorium from rare earth for rare earth production—A review. Minerals Engineering 77, 185-196.

The invention claimed is:

1. A method for grinding or comminuting a metal-containing ore, substrate, mine-waste, or radioactive waste, comprising the steps of:
   a. adding the metal-containing ore, substrate, mine-waste, or radioactive waste to an apparatus comprising;
      i. a container comprising inner walls that define an open end and a closed end for the container, and a lumen for retaining the ore, substrate, mine-waste or radioactive waste, with two or more elongate ribs projecting inwardly from the walls and extending from the closed end towards the open end of the container, wherein the inner walls of the container define the lumen as a cylindrical lumen for the container, defined by a continuous, cylindrical side wall portion extending between the open and closed ends of the container, and a substantially circular floor portion at the closed end of the container, the elongate ribs extending such that they radiate from a centre of said circular portion and continue along said cylindrical side wall portion from the closed end to the open end of the container;
      ii. a powered, rotatable spindle extending into and axially aligned with the container, substantially equidistant from side walls of the inner walls of the container;
      iii. a plurality of from 2 to 20 grinding arms arranged about and extending from the spindle such that each comprises at least one free end that passes with a clearance of from 0.01 mm to 20 mm from each of the ribs on the inner walls of the container, as the spindle is rotated, wherein the grinding arms other than the grinding arm or arms adjacent the closed end of the container are at least substantially uniformly elliptical in cross-section, or at least substantially uniformly circular in cross-section, with the grinding arm or arms adjacent the closed end of the container have having a substantially square or rectangular cross-section, wherein the grinding arms adjacent the closed end of the container, during operation and rotation of the spindle, pass adjacent the portion of the elongate ribs that radiate from the centre of the substantially circular floor portion at the closed end of the container, with a clearance of from 0.5-10 mm therefrom; and
      iv. a motor to drive axial rotation of the spindle and attached grinding arms within the container; and
   b. applying power to the motor thereby to rotate the spindle and attached grinding arms, to grind or comminute the metal-containing ore, substrate, mine-waste, or radioactive waste.

2. The method of claim 1, wherein step a comprises adding a metal-containing ore, the method further comprising a step of adding to the metal-containing ore, either before, together with or after step a., an aqueous inorganic acid at a concentration of between 1 M and 9 M, at a temperature of less than about 100° C., to solubilize at least a portion of the at least one metal-containing ore, thereby to produce a mixture of a metal-rich leachate and a metal-poor ore or waste.

3. The method of claim 1, wherein the metal-containing ore comprises uranium, cesium, mercury, thorium, rare earth elements, or combinations thereof.

4. The method of claim 1, wherein the radioactive waste is a cemented radioactive waste or a radioactive mine waste.

5. The method of claim 2, wherein the inorganic acid comprises sulfuric acid, nitric acid, hydrochloric acid, phosphoric acid, mixtures thereof, or combinations of inorganic acid and salts thereof.

6. The method of claim 2, further comprising, either before or after the adding of the aqueous inorganic acid, a step of adding an aqueous inorganic base with the addition of water, or with an aqueous organic base at a concentration of from 1 M to 7.5 M, to solubilize at least a portion of the at least one metal providing an aqueous mixture.

7. The method of claim 2, further comprising addition of a leaching salt, wherein the leaching salt comprises a halogen salt or a mercury salt, or any combination thereof.

8. The method of claim 2, further comprising a step of: separating the mixture of a metal-rich leachate and a metal-poor ore or waste.

9. The method of claim 1, further comprising a step of adding a grinding media.

\* \* \* \* \*